US011768185B2

(12) United States Patent
Day et al.

(10) Patent No.: US 11,768,185 B2
(45) Date of Patent: Sep. 26, 2023

(54) ANALYZING DATA COLLECTED BY ANALYTICAL INSTRUMENTS

(71) Applicant: Wyatt Technology Corporation, Goleta, CA (US)

(72) Inventors: Vivianna Day, Goleta, CA (US); Barbara R. Maurer, San Jose, CA (US); Michael I. Larkin, Santa Barbara, CA (US); Jeremy W. Jarrett, Buellton, CA (US); Steven P. Trainoff, Santa Barbara, CA (US)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 673 days.

(21) Appl. No.: 16/528,628

(22) Filed: Aug. 1, 2019

(65) Prior Publication Data

US 2021/0033576 A1 Feb. 4, 2021

(51) Int. Cl.
*G01N 30/86* (2006.01)
*G01N 21/49* (2006.01)
*G01N 30/00* (2006.01)
*G01N 30/02* (2006.01)

(52) U.S. Cl.
CPC ......... *G01N 30/8675* (2013.01); *G01N 21/49* (2013.01); *G01N 30/0005* (2013.01); *G01N 2030/027* (2013.01)

(58) Field of Classification Search
CPC ............... G01N 30/8675; G01N 21/49; G01N 30/0005; G01N 2030/027
See application file for complete search history.

(56) References Cited

U.S. PATENT DOCUMENTS

| 7,386,427 | B2 | 6/2008 | Trainoff |
| 7,662,638 | B2* | 2/2010 | Dadala ............... G01N 30/8675 436/166 |
| 7,911,594 | B2 | 3/2011 | Trainoff |
| 2002/0155587 | A1* | 10/2002 | Opalsky ................. G16B 50/20 702/19 |

(Continued)

FOREIGN PATENT DOCUMENTS

| AU | WO2004038602 A1 * | 5/2004 | ......... G06F 19/3437 |
| CN | 102693498 A | 9/2012 | |

OTHER PUBLICATIONS

Baker, WO2004038602 (Year: 2004).*

(Continued)

*Primary Examiner* — Manuel L Barbee
(74) *Attorney, Agent, or Firm* — Leonard T. Guzman

(57) ABSTRACT

The present disclosure describes a method, a system, and a computer program product of analyzing data collected by analytical instruments. In an embodiment, the method, the system, and the computer program product include receiving set-up information, running at least one incomplete analytical method on at least one known sample on at least one analytical instrument with respect to the set-up information, resulting in known sample data, processing the at least one incomplete analytical method with respect to the known sample data, resulting in at least one validated analytical method, and running the at least one validated analytical method on at least one unknown sample on the at least one analytical instrument with respect to the set-up information, resulting in analyzed sample data.

15 Claims, 17 Drawing Sheets

(56) References Cited

U.S. PATENT DOCUMENTS

| | | | |
|---|---|---|---|
| 2003/0033091 A1* | 2/2003 | Opalsky | G16B 20/00 702/19 |
| 2011/0299084 A1 | 12/2011 | Feitisch et al. | |
| 2012/0221500 A1 | 8/2012 | Williamson | |
| 2013/0085684 A1 | 4/2013 | Le et al. | |
| 2016/0171066 A1 | 6/2016 | Charlet et al. | |

OTHER PUBLICATIONS

Harding, Current Protocols in Protein Science; Light Scattering, University of Nottingham School of Biology, Supplement II, pp. 1-14 (Year: 1998).*

International Search Report for PCT/US2020/044679, dated Nov. 4, 2020.

Written Opinion for PCT/US2020/044679, dated Nov. 4, 2020.

International Search Report for PCT/US2020/044678, dated Nov. 9, 2020.

Written Opinion for PCT/US2020/044678, dated Nov. 9, 2020.

* cited by examiner

ANALYZING DATA COLLECTED BY ANALYTICAL INSTRUMENTS

BACKGROUND

The present disclosure relates to analytical instruments, and more specifically, to analyzing data collected by analytical instruments.

SUMMARY

The present disclosure describes a computer implemented method, a system, and a computer program product of analyzing data collected by analytical instruments. In an exemplary embodiment, the computer implemented method, the system, and the computer program product include (1) receiving, by a computer system, set-up information, where the set-up information describes at least one analytical instrument, at least one analysis to be performed on data collected by the at least one analytical instrument, and at least one analytical method, resulting in at least one incomplete analytical method, (2) executing, by the computer system, in response to receiving at least one instruction to automate the at least one analysis, a set of logical operations running the at least one incomplete analytical method on at least one known sample on the at least one analytical instrument with respect to the set-up information, resulting in known sample data, (3) executing, by the computer system, a set of logical operations processing the at least one incomplete analytical method with respect to the known sample data, resulting in at least one validated analytical method, and (4) executing, by the computer system, a set of logical operations running the at least one validated analytical method on at least one unknown sample on the at least one analytical instrument with respect to the set-up information, resulting in analyzed sample data.

DETAILED DESCRIPTION

Figure 1A:
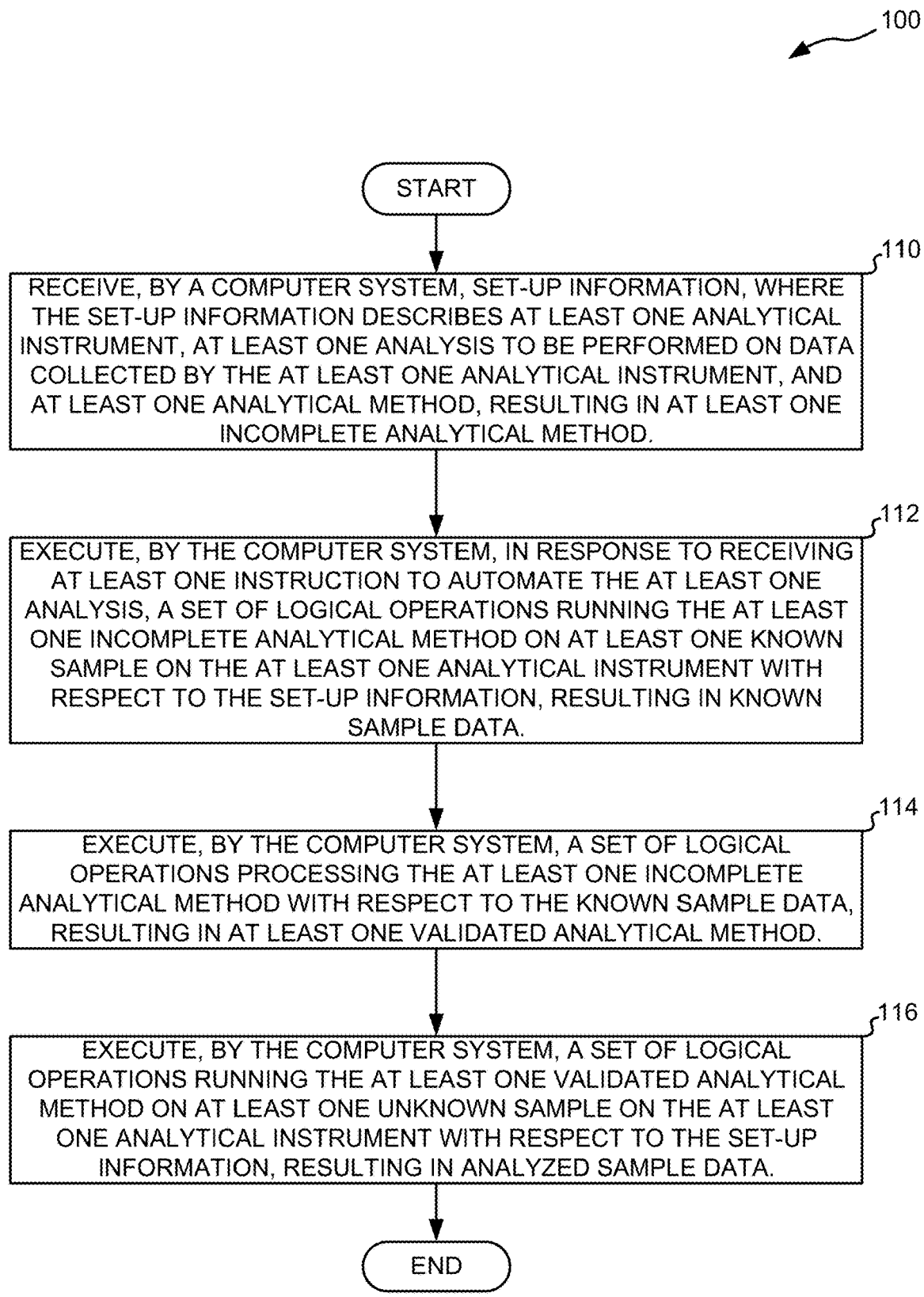
FIG. 1A depicts a flowchart in accordance with an exemplary embodiment.

The present disclosure describes a computer implemented method, a system, and a computer program product of analyzing data collected by analytical instruments. In an exemplary embodiment, the computer implemented method, the system, and the computer program product include (1) receiving, by a computer system, set-up information, where the set-up information describes at least one analytical instrument, at least one analysis to be performed on data collected by the at least one analytical instrument, and at least one analytical method, resulting in at least one incomplete analytical method, (2) executing, by the computer system, in response to receiving at least one instruction to automate the at least one analysis, a set of logical operations running the at least one incomplete analytical method on at least one known sample on the at least one analytical instrument with respect to the set-up information, resulting in known sample data, (3) executing, by the computer system, a set of logical operations processing the at least one incomplete analytical method with respect to the known sample data, resulting in at least one validated analytical method, and (4) executing, by the computer system, a set of logical operations running the at least one validated analytical method on at least one unknown sample on the at least one analytical instrument with respect to the set-up information, resulting in analyzed sample data. In an embodiment, the set-up information includes (a) instrument information describing the at least one analytical instrument, (b) configuration information describing at least one configuration of the at least one analytical instrument, (c) method information describing the at least one analytical method, and (d) operation information describing at least one operation to be performed during the at least one analysis. In a further embodiment, the set-up information further includes at least one of (e) application information describing at least one analytical application corresponding to the at least one analysis, (f) known sample information corresponding to the at least one known sample, (g) unknown sample information corresponding to the at least one unknown sample, and (h) flow information corresponding to at least one of the at least one analytical instrument, the at least one analysis, the at least one analytical method, and the at least one unknown sample.

In an embodiment, the at least one analytical instrument is one of a particle fractionation system, a light scattering instrument, a viscometer, a refractometer, an ultraviolet-visible absorption detector, an infrared absorption detector, an evaporative light scattering detector, a Raman spectroscopy detector, an inductively coupled plasma mass spectrometry, a fluorescence detector, a conductivity detector, and a pH detector. In an embodiment, the particle fractionation system is one of a liquid chromatography system and a field flow fractionation (FFF) system, (a) where the liquid chromatography system includes at least one of a high performance liquid chromatography system, an ultra-high-performance liquid chromatography system, a reverse-phase chromatography system, an affinity chromatography system, and a fast protein liquid chromatography system, and (b) where the FFF system includes at least one of an asymmetric flow FFF system, a gravitational FFF system, a centrifugal FFF system, a thermal-gradient FFF system, an electrical FFF system, a magnetic FFF system, a flow FFF system, a hollow fiber FFF system, and a split flow thin-cell fractionation system. In an embodiment, the liquid chromatography system includes at least one pump, at least one chromatography column, and at least one sample injector. In an embodiment, the light scattering instrument is one of a static light scattering instrument and a dynamic light scattering instrument.

In a further embodiment, the computer implemented method, the system, and the computer program product further include storing, by the computer system, the at least one validated analytical method in a data store. In a further embodiment, the computer implemented method, the system, and the computer program product further include executing, by the computer system, a set of logical operations generating at least one report describing the analyzed sample data.

In an embodiment, the computer implemented method, the system, and the computer program product enable producing accurate results with validated methods in a simple manner. In an embodiment, the computer implemented method, the system, and the computer program product (a) determine all of the analysis parameters (i.e., alignment, band-broadening, normalization) with one analytical run of a known sample, in response to one instruction/one click. In an embodiment, the computer implemented method, the system, and the computer program product save the analysis parameters to a validated method. In an embodiment, the computer implemented method, the system, and the computer program product analyze unknown samples using the saved analysis parameters.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Viscometer

A capillary bridge viscometer (VIS) is an instrument used to measure the specific viscosity of a solute in a suitable solvent. The specific viscosity is defined as $\eta_{sp}=\eta/\eta_0-1$, where $\eta$ is the viscosity of the sample and $\eta_0$ is the viscosity of the solvent. As a sample is introduced into the bridge viscometer, a pressure transducer generates a signal indicative of a pressure differential. This pressure differential, combined with a predetermined internal pressure of the system, is used to calculate the specific viscosity of the sample. The specific viscosity is useful in determining the molecular parameters of a polymer including molar mass and hydrodynamic radius.

The differential pressure transducer in a capillary bridge viscometer measures the differential pressure generated across fluid arms. The instrument measures the differential pressure values continuously while flowing fluid through the system. When pure solvent flows through the system and the bridge is balanced, the differential pressure measured should be zero. Impurities in the solvent, undissolved air bubbles, electrical noise, or micro leaks in the plumbing could cause undesired noise in the differential pressure measurement, which ultimately is used to determine the specific viscosity.

Differential Refractometer

A differential refractometer (DRI), or refractive index detector (RI or RID), is a detector that measures the refractive index of an analyte relative to the solvent. They are often used as detectors for high-performance liquid chromatography and size exclusion chromatography. DRIs are considered to be universal detectors because they can detect anything with a refractive index different from the solvent, but they have low sensitivity. When light leaves one material and enters another it bends, or refracts. The refractive index of a material is a measure of how much light bends when it enters.

Differential refractometers contain a flow cell with the following two parts: one for the sample; and one for the reference solvent. The RI detector measures the refractive index of both components. When only solvent is passing through the sample component, the measured refractive index of both components is the same, but when an analyte passes through the flow cell, the two measured refractive indices are different. The difference appears as a peak in the chromatogram. Differential refractometers are often used for the analysis of polymer samples in size exclusion chromatography.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_0$ is called the transmittance, and is usually expressed as a percentage (% T). The absorbance, A, is based on the transmittance according to $$A = -\log(\% T/100\%)$$

The UV-visible spectrophotometer can also be configured to measure reflectance, where the spectrophotometer measures the intensity of light reflected from a sample (I), and compares it to the intensity of light reflected from a reference material ($I_0$), where the ratio $I/I_0$ is called the reflectance, and is usually expressed as a percentage (% R).

Current Technologies

The data collected by current analytical instruments are not aligned or band-broadened by current technologies without human intervention. Also, current technologies do not identify peak regions in sample data without human intervention. In addition, current technologies do not process sample data, such as alignment, band-broadening, and normalization, through known sample data without human intervention.

Problems with Current Technologies

Current technologies for analyzing analytical data rely heavily on a user being diligent in keeping track of analysis parameters and validating analysis/analytical methods. Analyzing unknown samples require using validated analytical methods with appropriate analysis parameters. Current analytical instruments may not be aligned before band-broadening is performed on them while running analytical methods on unknown samples, resulting in inaccurately band-broadened unknown sample data. Also, current analytical instruments may not be band-broadened while running analytical methods on unknown samples, resulting in inaccurately analyzed unknown sample data. In addition, current analytical instruments may not be normalized, resulting in inaccurately analyzed unknown sample data. Without aligning, band-broadening, and normalization, analyzing unknown sample data may result in molar mass traces having slopes or molar mass traces with U shapes or molar mass traces at very different average y-values, producing inaccurate results. Thus, there is a need (a) to generate analytical methods that have been validated with respect to a known sample and (b) to run such validated analytical methods on unknown samples, in response to one instruction/click.

Referring to FIG. 1A, in an exemplary embodiment, the computer implemented method, the system, and the computer program product are configured to perform an operation 110 of receiving, by a computer system, set-up information, where the set-up information describes at least one analytical instrument, at least one analysis to be performed on data collected by the at least one analytical instrument, and at least one analytical method, resulting in at least one incomplete analytical method, an operation 112 of executing, by the computer system, in response to receiving at least one instruction to automate the at least one analysis, a set of logical operations running the at least one incomplete analytical method on at least one known sample on the at least one analytical instrument with respect to the set-up information, resulting in known sample data, an operation 114 of executing, by the computer system, a set of logical operations processing the at least one incomplete analytical method with respect to the known sample data, resulting in at least one validated analytical method, and an operation 116 of executing, by the computer system, a set of logical operations running the at least one validated analytical method on at least one unknown sample on the at least one analytical instrument with respect to the set-up information, resulting in analyzed sample data. In a further embodiment, the computer implemented method, the system, and the computer program product are further configured to perform an operation of storing, by the computer system, the at least one validated analytical method in a data store. In a further embodiment, the computer implemented method, the system, and the computer program product are further configured to perform an operation of executing, by the computer system, a set of logical operations generating at least one report describing the analyzed sample data.

Figure 10:
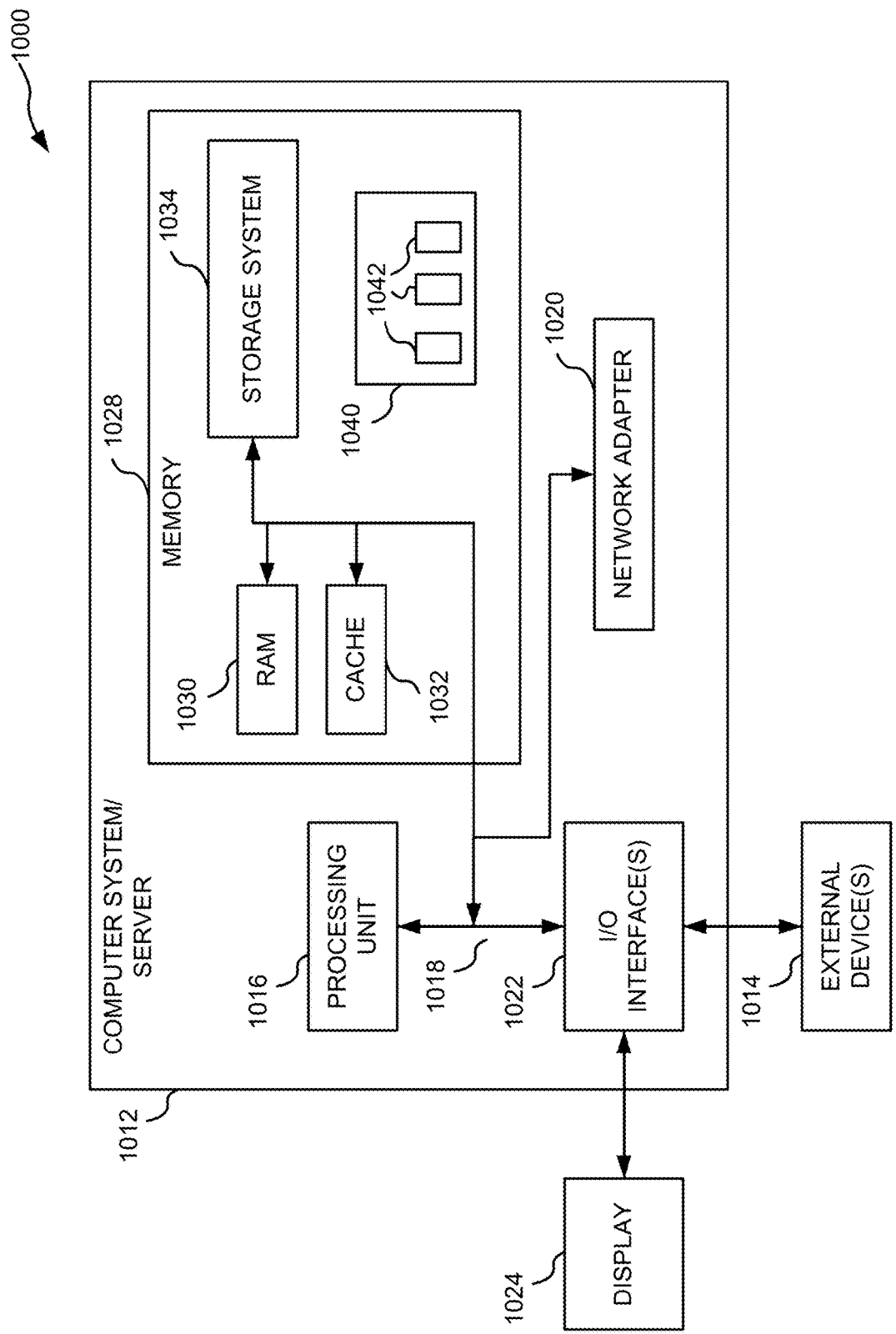
FIG. 10 depicts a computer system in accordance with an exemplary embodiment of the present invention.

In an exemplary embodiment, the computer system is a standalone computer system, such as computer system 1000 shown in FIG. 10, a network of distributed computers, where at least some of the computers are computer systems such as computer system 1000 shown in FIG. 10, or a cloud computing node server, such as computer system 1000 shown in FIG. 10. In an embodiment, the computer system is a computer system 1000 as shown in FIG. 10, that executes an analyzing data collected by analytical instruments script or computer software application that carries out the operations of at least method 100. In an embodiment, the computer system is a computer system/server 1012 as shown in FIG. 10, that executes an analyzing data collected by analytical instruments script or computer software application that carries out the operations of at least method 100. In an embodiment, the computer system is a processing unit 1016 as shown in FIG. 10, that executes an analyzing data collected by analytical instruments script or computer software application that carries out the operations of at least method 100. In an embodiment, the computer system is a processor of the analytical instrument, that executes an analyzing data collected by analytical instruments script or computer software application that carries out the operations of at least method 100.

In an embodiment, the computer system is a computer system 1000 as shown in FIG. 10, that executes an analyzing data collected by analytical instruments script or computer software application that carries out at least operations 110, 112, 114, and 116. In an embodiment, the computer system is a computer system/server 1012 as shown in FIG. 10, that executes an in analyzing data collected by analytical instruments script or computer software application that carries out at least operations 110, 112, 114, and 116. In an embodiment, the computer system is a processing unit 1016 as shown in FIG. 10, that executes an analyzing data collected by analytical instruments script or computer software application that carries out at least operations 110, 112, 114, and 116. In an embodiment, the computer system is a processor of the analytical instrument, that executes an analyzing data collected by analytical instruments script or computer software application that carries out at least operations 110, 112, 114, and 116.

Figure 1B:
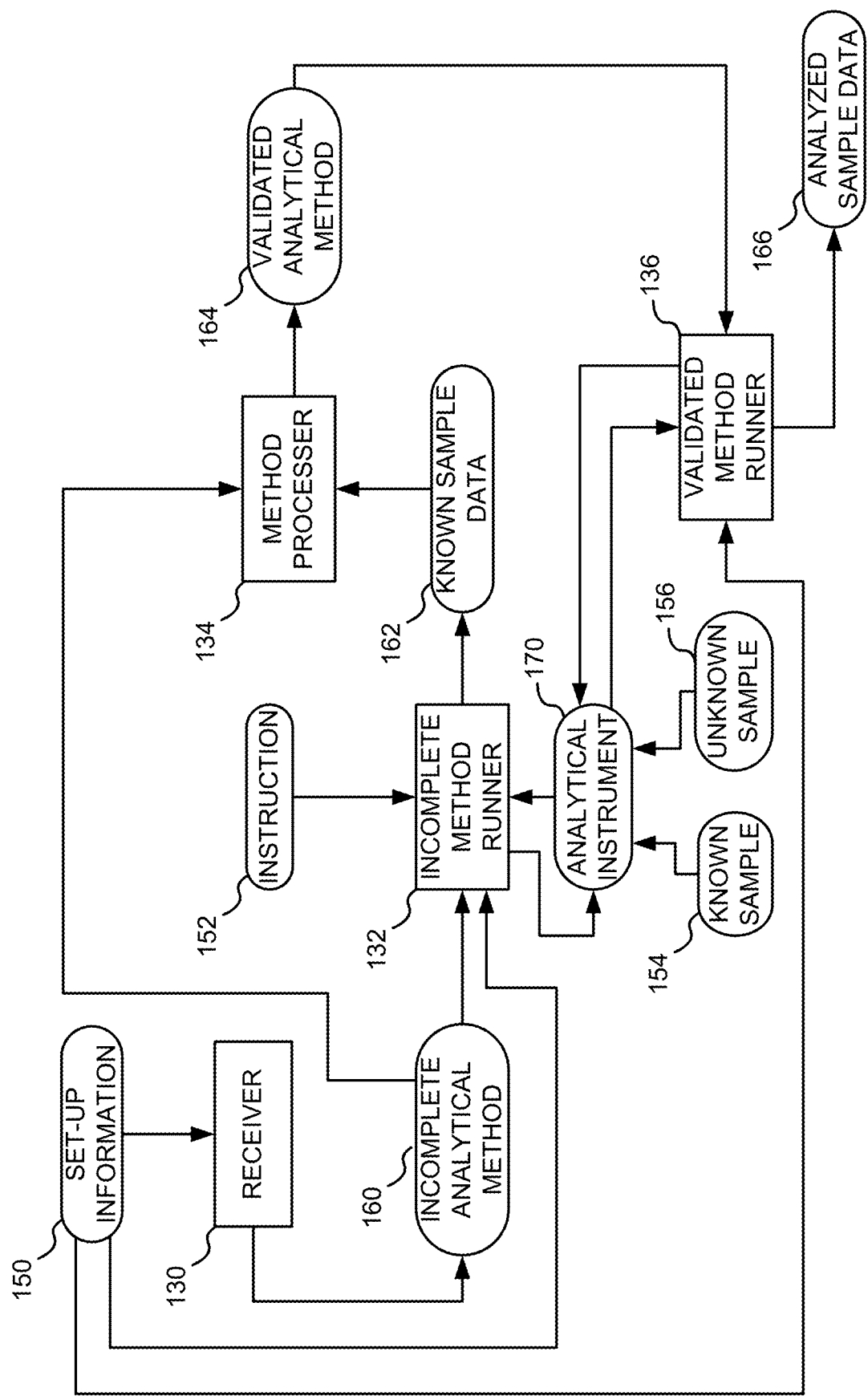
FIG. 1B depicts a block diagram in accordance with an exemplary embodiment.

Referring to FIG. 1B, in an exemplary embodiment, the computer implemented method, the system, and the computer program product include a receiver 130, an incomplete method runner 132, a method processor 134, and a validated method runner 136. In an embodiment, receiver 130 is configured to receive set-up information 150, where set-up information 150 describes at least one analytical instrument 170, at least one analysis to be performed on data collected by at least one analytical instrument 170, and at least one analytical method, resulting in at least one incomplete analytical method 160. In an embodiment, receiver 130 includes a computer system, such as computer system 1000 as shown in FIG. 10, performing operation 110. In an embodiment, receiver 130 includes a computer system, such as computer system/server 1012 as shown in FIG. 10, performing operation 110. In an embodiment, receiver 130 includes a computer system, such as processing unit 1016 as shown in FIG. 10, performing operation 110. In an embodiment, receiver 130 is implemented as computer software executing on a computer system, such as computer system 1000 as shown in FIG. 10, such that the computer system performs operation 110. In an embodiment, receiver 130 is implemented as computer software executing on a computer system, such as computer system/server 1012 as shown in FIG. 10, such that the computer system performs operation 110. In an embodiment, receiver 130 is implemented as computer software executing on a computer system, such as processing unit 1016 as shown in FIG. 10, such that the computer system performs operation 110. In an embodiment, receiver 130 performs operation 110 as computer software executing on a processor of receiver 130.

In an embodiment, incomplete method runner 132 is configured to execute, in response to receiving at least one instruction 152 to automate the at least one analysis, a set of logical operations running at least one incomplete analytical method 160 on at least one known sample 154 on at least one analytical instrument 170 with respect to set-up information 150, resulting in known sample data 162. In an embodiment, incomplete method runner 132 includes a computer system, such as computer system 1000 as shown in FIG. 10, performing operation 112. In an embodiment, incomplete method runner 132 includes a computer system, such as computer system/server 1012 as shown in FIG. 10, performing operation 112. In an embodiment, incomplete method runner 132 includes a computer system, such as processing unit 1016 as shown in FIG. 10, performing operation 112. In an embodiment, incomplete method runner 132 is implemented as computer software executing on a computer system, such as computer system 1000 as shown in FIG. 10, such that the computer system performs operation 112. In an embodiment, incomplete method runner 132 is implemented as computer software executing on a computer system, such as computer system/server 1012 as shown in FIG. 10, such that the computer system performs operation 112. In an embodiment, incomplete method runner 132 is implemented as computer software executing on a computer system, such as processing unit 1016 as shown in FIG. 10, such that the computer system performs operation 112. In an embodiment, incomplete method runner 132 performs operation 112 as computer software executing on a processor of incomplete method runner 132.

In an embodiment, method processor 134 is configured to execute a set of logical operations processing at least one incomplete analytical method 160 with respect to known sample data 162, resulting in at least one validated analytical method 164. In an embodiment, method processor 134 includes a computer system, such as computer system 1000 as shown in FIG. 10, performing operation 114. In an embodiment, method processor 134 includes a computer system, such as computer system/server 1012 as shown in FIG. 10, performing operation 114. In an embodiment, method processor 134 includes a computer system, such as processing unit 1016 as shown in FIG. 10, performing operation 114. In an embodiment, method processor 134 is implemented as computer software executing on a computer system, such as computer system 1000 as shown in FIG. 10, such that the computer system performs operation 114. In an embodiment, method processor 134 is implemented as computer software executing on a computer system, such as computer system/server 1012 as shown in FIG. 10, such that the computer system performs operation 114. In an embodiment, method processor 134 is implemented as computer software executing on a computer system, such as processing unit 1016 as shown in FIG. 10, such that the computer system performs operation 114. In an embodiment, method processor 134 performs operation 114 as computer software executing on a processor of method processor 134.

In an embodiment, validated method runner 136 is configured to execute a set of logical operations running at least one validated analytical method 164 on at least one unknown sample 156 on at least one analytical instrument 170 with respect to set-up information 150, resulting in analyzed sample data 166. In an embodiment, validated method runner 136 includes a computer system, such as computer system 1000 as shown in FIG. 10, performing operation 116. In an embodiment, validated method runner 136 includes a computer system, such as computer system/server 1012 as shown in FIG. 10, performing operation 116. In an embodiment, validated method runner 136 includes a computer system, such as processing unit 1016 as shown in FIG. 10, performing operation 116. In an embodiment, validated method runner 136 is implemented as computer software executing on a computer system, such as computer system 1000 as shown in FIG. 10, such that the computer system performs operation 116. In an embodiment, validated method runner 136 is implemented as computer software executing on a computer system, such as computer system/server 1012 as shown in FIG. 10, such that the computer system performs operation 116. In an embodiment, validated method runner 136 is implemented as computer software executing on a computer system, such as processing unit 1016 as shown in FIG. 10, such that the computer system performs operation 116. In an embodiment, validated method runner 136 performs operation 116 as computer software executing on a processor of validated method runner 136.

Figure 1C:
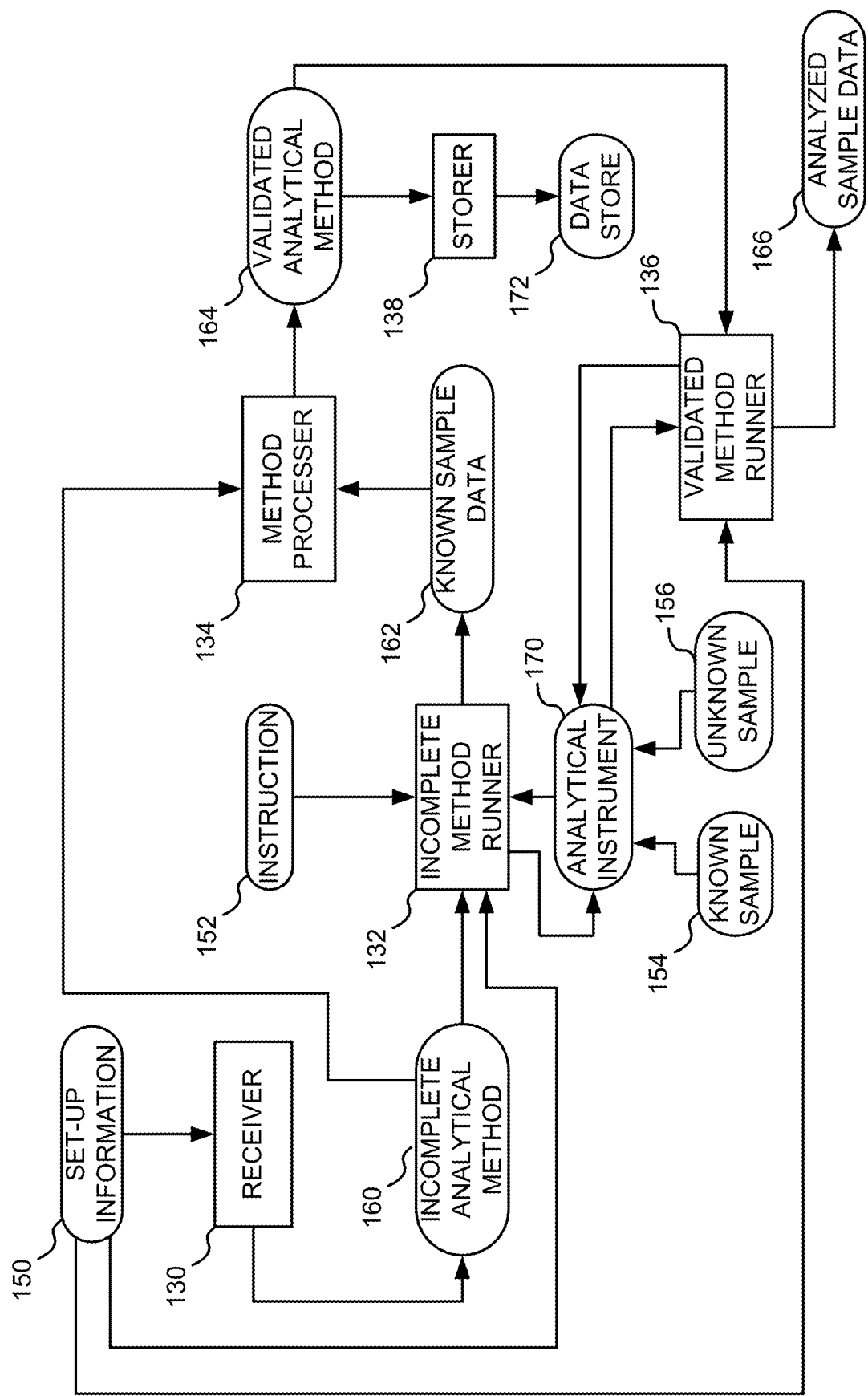
FIG. 1C depicts a block diagram in accordance with an exemplary embodiment.

Referring to FIG. 1C, in a further embodiment, the computer implemented method, the system, and the computer program product further include a storer 138. In a further embodiment, storer 138 is configured to store at least one validated analytical method 164 in a data store 172. In an embodiment, storer 138 includes a computer system, such as computer system 1000 as shown in FIG. 10, performing an operation of storing at least one validated analytical method 164 in data store 172. In an embodiment, storer 138 includes a computer system, such as computer system/server 1012 as shown in FIG. 10, performing an operation of storing at least one validated analytical method 164 in data store 172. In an embodiment, storer 138 includes a computer system, such as processing unit 1016 as shown in FIG. 10, performing an operation of storing at least one validated analytical method 164 in data store 172. In an embodiment, storer 138 is implemented as computer software executing on a computer system, such as computer system 1000 as shown in FIG. 10, such that the computer system performs an operation of storing at least one validated analytical method 164 in data store 172. In an embodiment, storer 138 is implemented as computer software executing on a computer system, such as computer system/server 1012 as shown in FIG. 10, such that the computer system performs an operation of storing at least one validated analytical method 164 in data store 172. In an embodiment, storer 138 is implemented as computer software executing on a computer system, such as processing unit 1016 as shown in FIG. 10, such that the computer system performs an operation of storing at least one validated analytical method 164 in data store 172. In an embodiment, storer 138 performs an operation of storing at least one validated analytical method 164 in data store 172 as computer software executing on a processor of storer 138.

Processing Incomplete Analytical Method

Figure 2A:
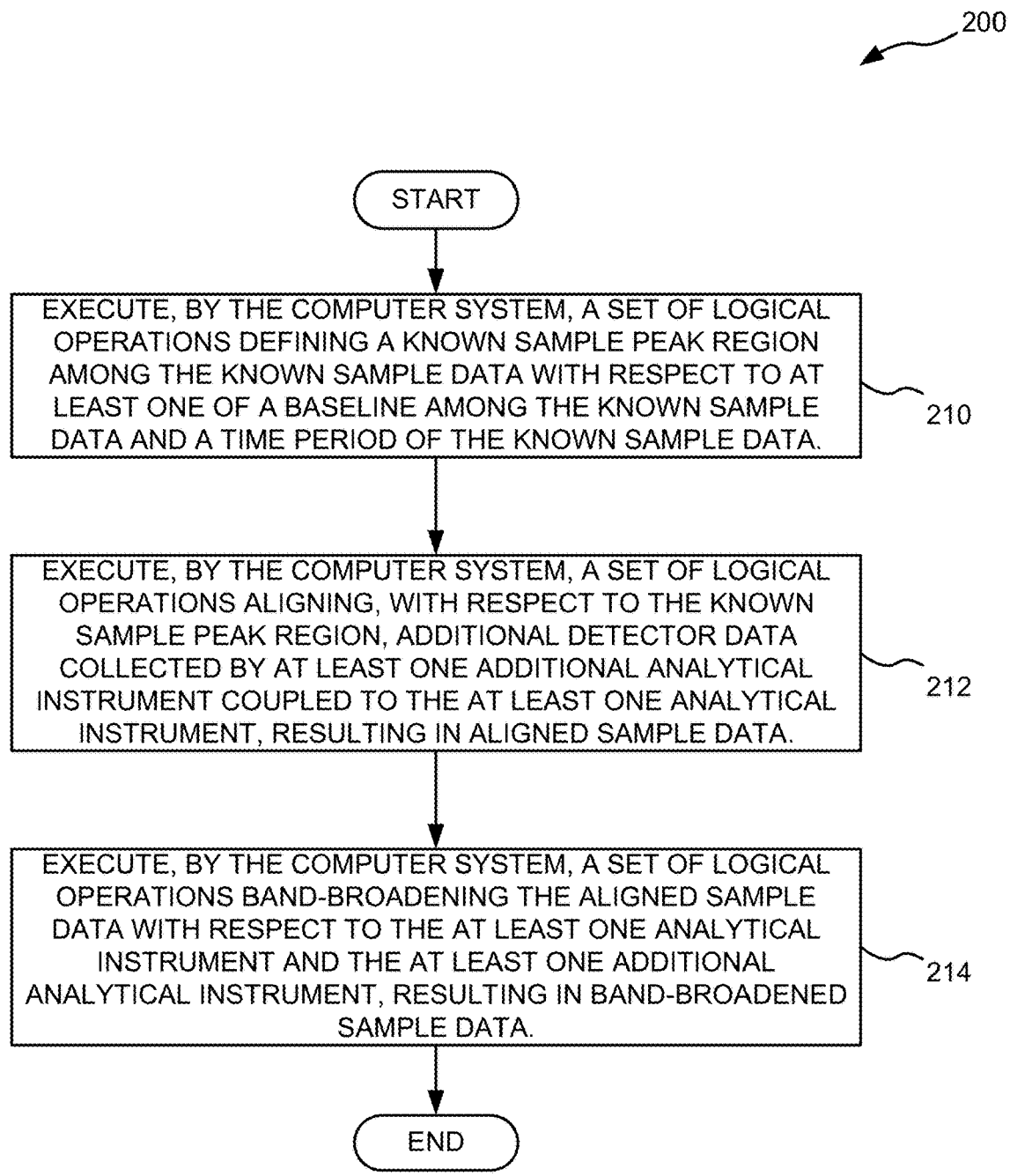
FIG. 2A depicts a flowchart in accordance with an exemplary embodiment.

In an exemplary embodiment, the processing includes (a) executing, by the computer system, a set of logical operations defining a known sample peak region among the known sample data with respect to at least one of a baseline among the known sample data and a time period of the known sample data, (b) executing, by the computer system, a set of logical operations aligning, with respect to the known sample peak region, additional detector data collected by at least one additional analytical instrument coupled to the at least one analytical instrument, resulting in aligned sample data, and (c) executing, by the computer system, a set of logical operations band-broadening the aligned sample data with respect to the at least one analytical instrument and the at least one additional analytical instrument, resulting in band-broadened sample data. Referring to FIG. 2A, in an exemplary embodiment, processing operation 114 includes an operation 210 of executing, by the computer system, a set of logical operations defining a known sample peak region among the known sample data with respect to at least one of a baseline among the known sample data and a time period of the known sample data, an operation 212 of executing, by the computer system, a set of logical operations aligning, with respect to the known sample peak region, additional detector data collected by at least one additional analytical instrument coupled to the at least one analytical instrument, resulting in aligned sample data, and an operation 214 of executing, by the computer system, a set of logical operations band-broadening the aligned sample data with respect to the at least one analytical instrument and the at least one additional analytical instrument, resulting in band-broadened sample data. For example, processing operation 114 post-processes the known sample data through alignment and band broadening, thereby allowing for the production of accurate analysis results.

In an embodiment, method processor 134 includes a computer system 1000 as shown in FIG. 10, that executes an analyzing data collected by analytical instruments script or computer software application that carries out the operations of at least method 200. In an embodiment, method processor 134 includes a computer system/server 1012 as shown in FIG. 10, that executes an analyzing data collected by analytical instruments script or computer software application that carries out the operations of at least method 200. In an embodiment, method processor 134 includes a processing unit 1016 as shown in FIG. 10, that executes an analyzing data collected by analytical instruments script or computer software application that carries out the operations of at least method 200. In an embodiment, method processor 134 is a processor of at least one analytical instrument 170, that executes an analyzing data collected by analytical instruments script or computer software application that carries out the operations of at least method 200.

In an embodiment, method processor 134 includes a computer system 1000 as shown in FIG. 10, that executes an analyzing data collected by analytical instruments script or computer software application that carries out at least operations 210, 212, and 214. In an embodiment, method processor 134 includes a computer system/server 1012 as shown in FIG. 10, that executes an analyzing data collected by analytical instruments script or computer software application that carries out at least operations 210, 212, and 214. In an embodiment, method processor 134 includes a processing unit 1016 as shown in FIG. 10, that executes an analyzing data collected by analytical instruments script or computer software application that carries out at least operations 210, 212, and 214. In an embodiment, method processor 134 is a processor of at least one analytical instrument 170, that executes an analyzing data collected by analytical instruments script or computer software application that carries out at least operations 210, 212, and 214.

Figure 2B:
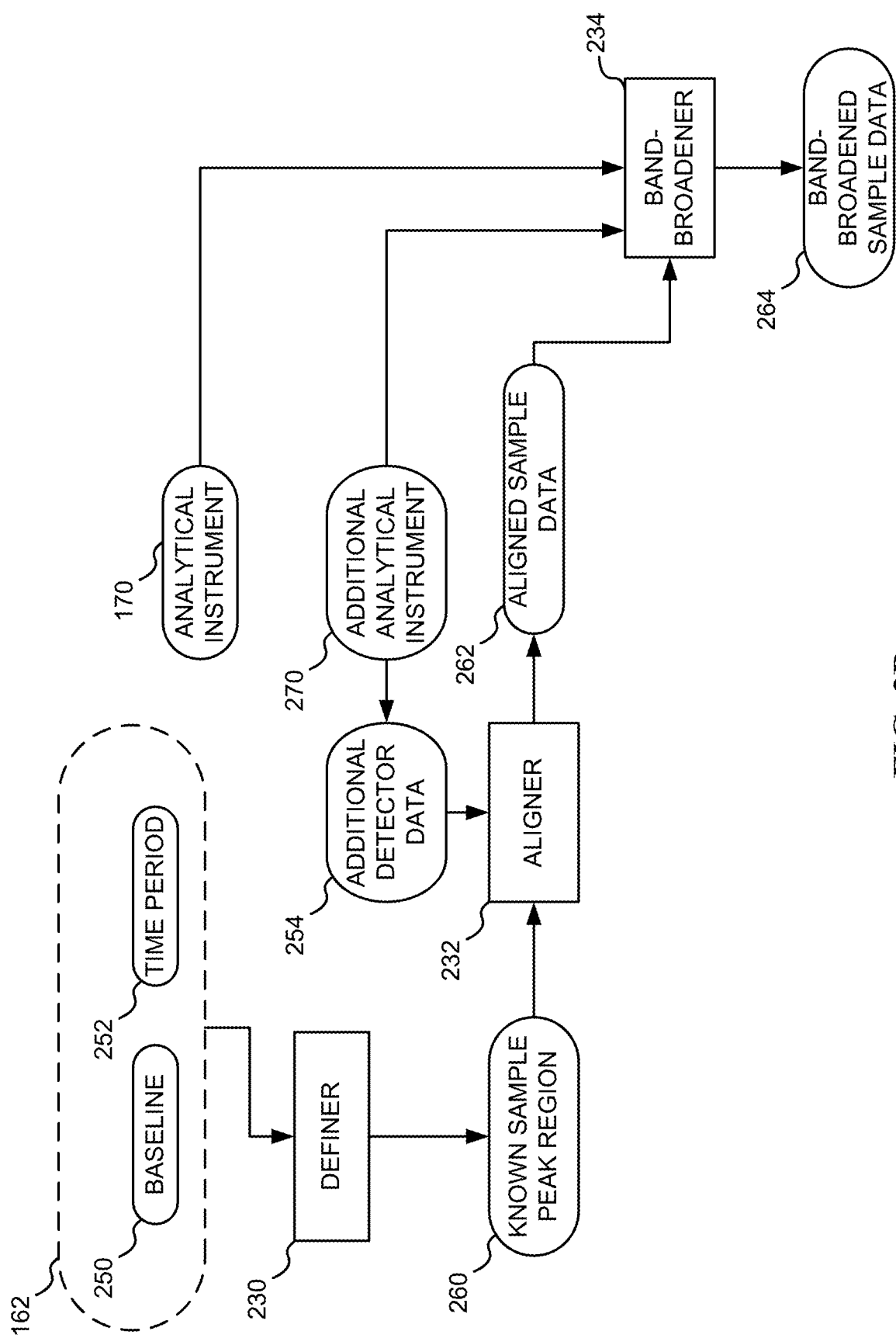
FIG. 2B depicts a block diagram in accordance with an exemplary embodiment.

Referring to FIG. 2B, in an exemplary embodiment, method processer 134 includes a definer 230, an aligner 232, and a band-broadener 234. In an embodiment, definer 230 is configured to execute a set of logical operations defining a known sample peak region 260 among known sample data 162 with respect to at least one of a baseline 250 among known sample data 162 and a time period 252 of known sample data 162. In an embodiment, definer 230 includes a computer system, such as computer system 1000 as shown in FIG. 10, performing operation 210. In an embodiment, definer 230 includes a computer system, such as computer system/server 1012 as shown in FIG. 10, performing operation 210. In an embodiment, definer 230 includes a computer system, such as processing unit 1016 as shown in FIG. 10, performing operation 210. In an embodiment, definer 230 is implemented as computer software executing on a computer system, such as computer system 1000 as shown in FIG. 10, such that the computer system performs operation 210. In an embodiment, definer 230 is implemented as computer software executing on a computer system, such as computer system/server 1012 as shown in FIG. 10, such that the computer system performs operation 210. In an embodiment, definer 230 is implemented as computer software executing on a computer system, such as processing unit 1016 as shown in FIG. 10, such that the computer system performs operation 210. In an embodiment, definer 230 performs operation 210 as computer software executing on a processor of definer 230.

In an embodiment, aligner 232 is configured to execute a set of logical operations aligning, with respect to known sample peak region 260, additional detector data 254 collected by at least one additional analytical instrument 270 coupled to at least one analytical instrument 170, resulting in aligned sample data 262. In an embodiment, aligner 232 includes a computer system, such as computer system 1000 as shown in FIG. 10, performing operation 212. In an embodiment, aligner 232 includes a computer system, such as computer system/server 1012 as shown in FIG. 10, performing operation 212. In an embodiment, aligner 232 includes a computer system, such as processing unit 1016 as shown in FIG. 10, performing operation 212. In an embodiment, aligner 232 is implemented as computer software executing on a computer system, such as computer system 1000 as shown in FIG. 10, such that the computer system performs operation 212. In an embodiment, aligner 232 is implemented as computer software executing on a computer system, such as computer system/server 1012 as shown in FIG. 10, such that the computer system performs operation 212. In an embodiment, aligner 232 is implemented as computer software executing on a computer system, such as processing unit 1016 as shown in FIG. 10, such that the computer system performs operation 212. In an embodiment, aligner 232 performs operation 212 as computer software executing on a processor of aligner 232.

In an embodiment, band-broadener 234 is configured to execute a set of logical operations band-broadening aligned sample data 262 with respect to at least one analytical instrument 170 and at least one additional analytical instrument 270, resulting in band-broadened sample data 264. In an embodiment, band-broadener 234 includes a computer system, such as computer system 1000 as shown in FIG. 10, performing operation 214. In an embodiment, band-broadener 234 includes a computer system, such as computer system/server 1012 as shown in FIG. 10, performing operation 214. In an embodiment, band-broadener 234 includes a computer system, such as processing unit 1016 as shown in FIG. 10, performing operation 214. In an embodiment, band-broadener 234 is implemented as computer software executing on a computer system, such as computer system 1000 as shown in FIG. 10, such that the computer system performs operation 214. In an embodiment, band-broadener 234 is implemented as computer software executing on a computer system, such as computer system/server 1012 as shown in FIG. 10, such that the computer system performs operation 214. In an embodiment, band-broadener 234 is implemented as computer software executing on a computer system, such as processing unit 1016 as shown in FIG. 10, such that the computer system performs operation 214. In an embodiment, band-broadener 234 performs operation 214 as computer software executing on a processor of band-broadener 234.

Defining Known Sample Peak Region

Figure 3A:
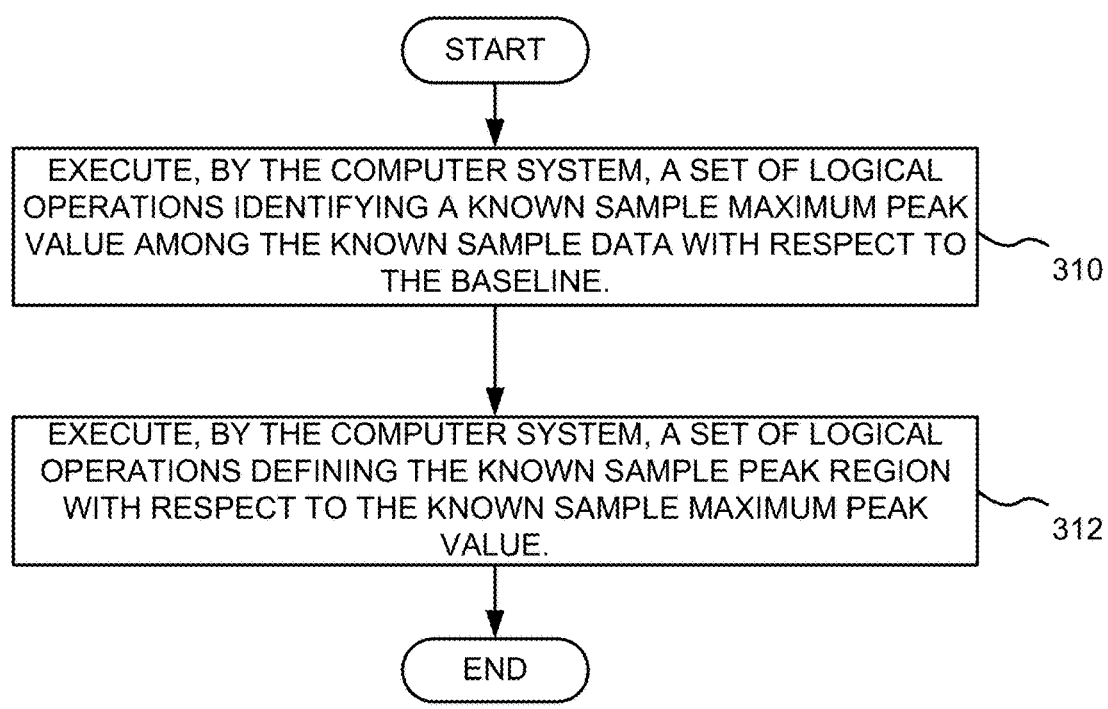
FIG. 3A depicts a flowchart in accordance with an exemplary embodiment.

In an embodiment, the defining includes (a) executing, by the computer system, a set of logical operations identifying a known sample maximum peak value among the known sample data with respect to the baseline, and (b) executing, by the computer system, a set of logical operations defining the known sample peak region with respect to the known sample maximum peak value. Referring to FIG. 3A, in an exemplary embodiment, defining operation 210 includes (a) an operation 310 of executing, by the computer system, a set of logical operations identifying a known sample maximum peak value among the known sample data with respect to the baseline, and (b) an operation 312 of executing, by the computer system, a set of logical operations defining the known sample peak region with respect to the known sample maximum peak value. In an embodiment, defining operation 210 determines the known sample peak region by applying a threshold to the known data from one analytical instrument. In an embodiment, identifying operation 310 finds a peak maximum (i.e., known sample maximum peak value) among the known sample data by stepping through the known sample data and determining when a curve representing the known sample data transitions from increasing to decreasing. In an embodiment, defining operation 312 defines the peak region by finding time values that correspond to a certain percentage (e.g., 10%) of the peak maximum (i.e., known sample maximum peak value), such that maxima from other data traces fall within the defined peak region (i.e., known sample peak region). For example, the percentage could range from 1% to 50%.

In an embodiment, definer 230 includes a computer system 1000 as shown in FIG. 10, that executes an analyzing data collected by analytical instruments script or computer software application that carries out the operations of at least method 300. In an embodiment, definer 230 includes a computer system/server 1012 as shown in FIG. 10, that executes an analyzing data collected by analytical instruments script or computer software application that carries out the operations of at least method 300. In an embodiment, definer 230 includes a processing unit 1016 as shown in FIG. 10, that executes an analyzing data collected by analytical instruments script or computer software application that carries out the operations of at least method 300. In an embodiment, definer 230 is a processor of at least one analytical instrument 170, that executes an analyzing data collected by analytical instruments script or computer software application that carries out the operations of at least method 300.

In an embodiment, definer 230 includes a computer system 1000 as shown in FIG. 10, that executes an analyzing data collected by analytical instruments script or computer software application that carries out at least operations 310 and 312. In an embodiment, definer 230 includes a computer system/server 1012 as shown in FIG. 10, that executes an analyzing data collected by analytical instruments script or computer software application that carries out at least operations 310 and 312. In an embodiment, definer 230 includes a processing unit 1016 as shown in FIG. 10, that executes an analyzing data collected by analytical instruments script or computer software application that carries out at least operations 310 and 312. In an embodiment, definer 230 is a processor of at least one analytical instrument 170, that executes an analyzing data collected by analytical instruments script or computer software application that carries out at least operations 310 and 312.

In an embodiment, definer 230 is configured to execute a set of logical operations identifying a known sample maximum peak value among known sample data 162 with respect to baseline 250. In an embodiment, definer 230 includes a computer system, such as computer system 1000 as shown in FIG. 10, performing operation 310. In an embodiment, definer 230 includes a computer system, such as computer system/server 1012 as shown in FIG. 10, performing operation 310. In an embodiment, definer 230 includes a computer system, such as processing unit 1016 as shown in FIG. 10, performing operation 310. In an embodiment, definer 230 is a processor of at least one analytical instrument 170 performing operation 310. In an embodiment, definer 230 is implemented as computer software executing on a computer system, such as computer system 1000 as shown in FIG. 10, such that the computer system performs operation 310. In an embodiment, definer 230 is implemented as computer software executing on a computer system, such as computer system/server 1012 as shown in FIG. 10, such that the computer system performs operation 310. In an embodiment, definer 230 is implemented as computer software executing on a computer system, such as processing unit 1016 as shown in FIG. 10, such that the computer system performs operation 310. In an embodiment, definer 230 is implemented as computer software executing on a computer system, such as a processor of at least one analytical instrument 170, such that the computer system performs operation 310. In an embodiment, definer 230 performs operation 310 as computer software executing on a processor of definer 230. In an embodiment, definer 230 performs operation 310 as computer software executing on a processor of at least one analytical instrument 170.

In an embodiment, definer 230 is configured to execute a set of logical operations defining known sample peak region 260 with respect to the known sample maximum peak value. In an embodiment, definer 230 includes a computer system, such as computer system 1000 as shown in FIG. 10, performing operation 312. In an embodiment, definer 230 includes a computer system, such as computer system/server 1012 as shown in FIG. 10, performing operation 312. In an embodiment, definer 230 includes a computer system, such as processing unit 1016 as shown in FIG. 10, performing operation 312. In an embodiment, definer 230 is a processor of at least one analytical instrument 170 performing operation 312. In an embodiment, definer 230 is implemented as computer software executing on a computer system, such as computer system 1000 as shown in FIG. 10, such that the computer system performs operation 312. In an embodiment, definer 230 is implemented as computer software executing on a computer system, such as computer system/server 1012 as shown in FIG. 10, such that the computer system performs operation 312. In an embodiment, definer 230 is implemented as computer software executing on a computer system, such as processing unit 1016 as shown in FIG. 10, such that the computer system performs operation 312. In an embodiment, definer 230 is implemented as computer software executing on a computer system, such as a processor of at least one analytical instrument 170, such that the computer system performs operation 312. In an embodiment, definer 230 performs operation 312 as computer software executing on a processor of definer 230. In an embodiment, definer 230 performs operation 312 as computer software executing on a processor of at least one analytical instrument 170.

Aligning Additional Detector Data

Figure 3B:
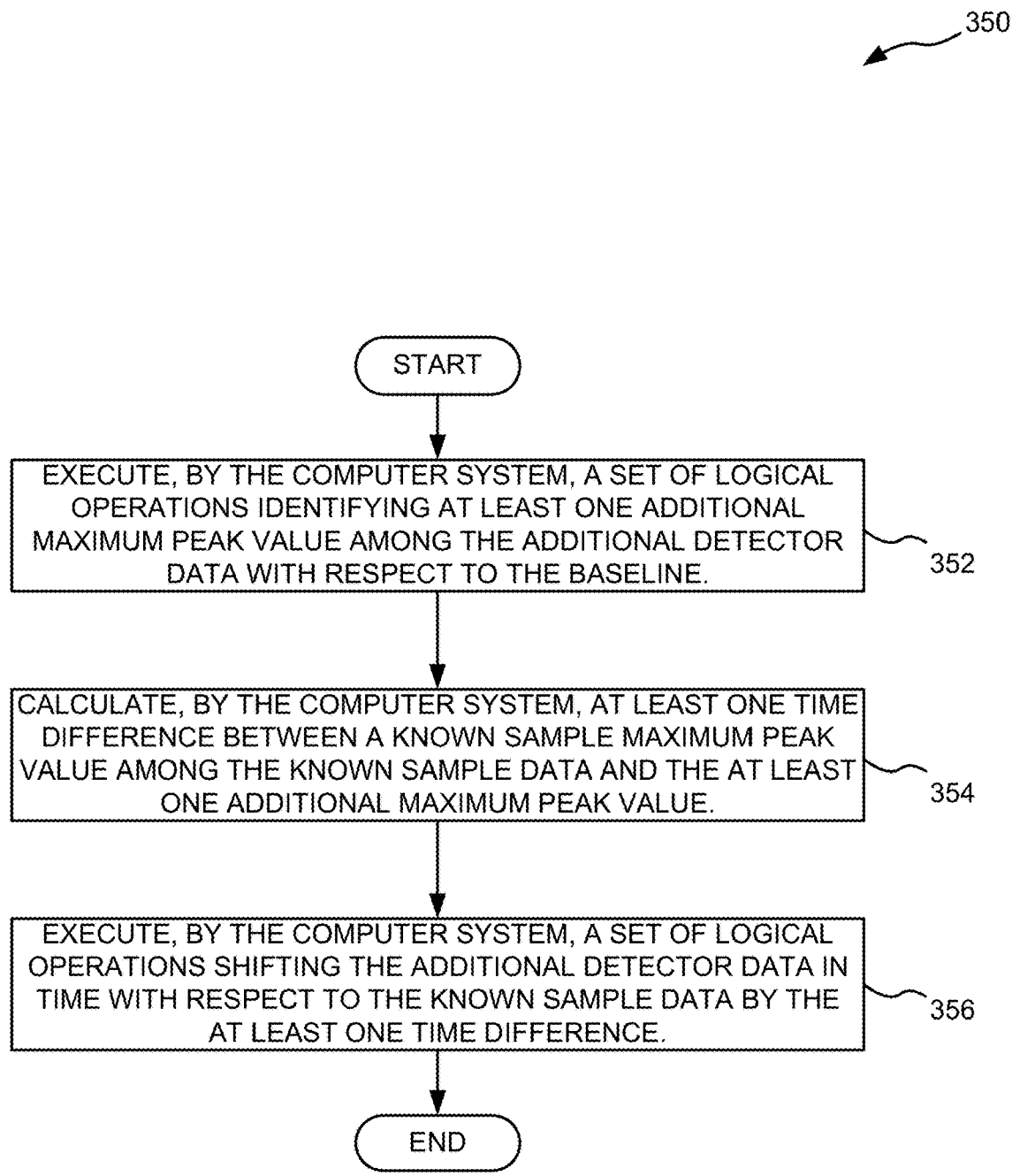
FIG. 3B depicts a block diagram in accordance with an exemplary embodiment.

In an embodiment, the aligning includes (a) executing, by the computer system, a set of logical operations identifying at least one additional maximum peak value among the additional detector data with respect to the baseline, (b) calculating, by the computer system, at least one time difference between a known sample maximum peak value among the known sample data and the at least one additional maximum peak value, and (c) executing, by the computer system, a set of logical operations shifting the additional detector data in time with respect to the known sample data by the at least one time difference. Referring to FIG. 3B, in an exemplary embodiment, aligning operation 212 includes (a) an operation 352 of executing, by the computer system, a set of logical operations identifying at least one additional maximum peak value among the additional detector data with respect to the baseline, (b) an operation 354 of calculating, by the computer system, at least one time difference between a known sample maximum peak value among the known sample data and the at least one additional maximum peak value, and (c) an operation 356 of executing, by the computer system, a set of logical operations shifting the additional detector data in time with respect to the known sample data by the at least one time difference. In an embodiment, identifying operation 352 determines the arrival time of peak maxima (i.e., at least one additional maximum peak value) from each data stream (i.e., additional detector data) within the known sample peak region defined by defining operation 210. In an embodiment, calculating operation 352 calculates the time difference between downstream instruments (i.e., at least one additional analytical instrument) and the at least one analytical instrument (e.g., a light scattering instrument). In an embodiment, shifting operation 356 shifts the time base of the data traces (i.e., additional detector data) of the downstream instruments by the calculated time difference to align the peak maxima among the various detectors.

In an embodiment, aligner 232 includes a computer system 1000 as shown in FIG. 10, that executes an analyzing data collected by analytical instruments script or computer software application that carries out the operations of at least method 350. In an embodiment, aligner 232 includes a computer system/server 1012 as shown in FIG. 10, that executes an analyzing data collected by analytical instruments script or computer software application that carries out the operations of at least method 350. In an embodiment, aligner 232 includes a processing unit 1016 as shown in FIG. 10, that executes an analyzing data collected by analytical instruments script or computer software application that carries out the operations of at least method 350. In an embodiment, aligner 232 is a processor of at least one analytical instrument 170, that executes an analyzing data collected by analytical instruments script or computer software application that carries out the operations of at least method 350.

In an embodiment, aligner 232 includes a computer system 1000 as shown in FIG. 10, that executes an analyzing data collected by analytical instruments script or computer software application that carries out at least operations 352, 354, and 356. In an embodiment, aligner 232 includes a computer system/server 1012 as shown in FIG. 10, that executes an analyzing data collected by analytical instruments script or computer software application that carries out at least operations 352, 354, and 356. In an embodiment, aligner 232 includes a processing unit 1016 as shown in FIG. 10, that executes an analyzing data collected by analytical instruments script or computer software application that carries out at least operations 352, 354, and 356. In an embodiment, aligner 232 is a processor of at least one analytical instrument 170, that executes an analyzing data collected by analytical instruments script or computer software application that carries out at least operations 352, 354, and 356.

In an embodiment, aligner 232 is configured to execute a set of logical operations identifying at least one additional maximum peak value among additional detector data 254 with respect to baseline 250. In an embodiment, aligner 232 includes a computer system, such as computer system 1000 as shown in FIG. 10, performing operation 352. In an embodiment, aligner 232 includes a computer system, such as computer system/server 1012 as shown in FIG. 10, performing operation 352. In an embodiment, aligner 232 includes a computer system, such as processing unit 1016 as shown in FIG. 10, performing operation 352. In an embodiment, aligner 232 is a processor of at least one analytical instrument 170 performing operation 352. In an embodiment, aligner 232 is implemented as computer software executing on a computer system, such as computer system 1000 as shown in FIG. 10, such that the computer system performs operation 352. In an embodiment, aligner 232 is implemented as computer software executing on a computer system, such as computer system/server 1012 as shown in FIG. 10, such that the computer system performs operation 352. In an embodiment, aligner 232 is implemented as computer software executing on a computer system, such as processing unit 1016 as shown in FIG. 10, such that the computer system performs operation 352. In an embodiment, aligner 232 is implemented as computer software executing on a computer system, such as a processor of at least one analytical instrument 170, such that the computer system performs operation 352. In an embodiment, aligner 232 performs operation 352 as computer software executing on a processor of aligner 232. In an embodiment, aligner 232 performs operation 352 as computer software executing on a processor of at least one analytical instrument 170.

In an embodiment, aligner 232 is configured to calculate at least one time difference between a known sample maximum peak value among known sample data 162 and the at least one additional maximum peak value. In an embodiment, aligner 232 includes a computer system, such as computer system 1000 as shown in FIG. 10, performing operation 354. In an embodiment, aligner 232 includes a computer system, such as computer system/server 1012 as shown in FIG. 10, performing operation 354. In an embodiment, aligner 232 includes a computer system, such as processing unit 1016 as shown in FIG. 10, performing operation 354. In an embodiment, aligner 232 is a processor of at least one analytical instrument 170 performing operation 354. In an embodiment, aligner 232 is implemented as computer software executing on a computer system, such as computer system 1000 as shown in FIG. 10, such that the computer system performs operation 354. In an embodiment, aligner 232 is implemented as computer software executing on a computer system, such as computer system/server 1012 as shown in FIG. 10, such that the computer system performs operation 354. In an embodiment, aligner 232 is implemented as computer software executing on a computer system, such as processing unit 1016 as shown in FIG. 10, such that the computer system performs operation 354. In an embodiment, aligner 232 is implemented as computer software executing on a computer system, such as a processor of at least one analytical instrument 170, such that the computer system performs operation 354. In an embodiment, aligner 232 performs operation 354 as computer software executing on a processor of aligner 232. In an embodiment, aligner 232 performs operation 354 as computer software executing on a processor of at least one analytical instrument 170.

In an embodiment, aligner 232 is configured to executing a set of logical operations shifting additional detector data 254 in time with respect to known sample data 162 by the at least one time difference. In an embodiment, aligner 232 includes a computer system, such as computer system 1000 as shown in FIG. 10, performing operation 356. In an embodiment, aligner 232 includes a computer system, such as computer system/server 1012 as shown in FIG. 10, performing operation 356. In an embodiment, aligner 232 includes a computer system, such as processing unit 1016 as shown in FIG. 10, performing operation 356. In an embodiment, aligner 232 is a processor of at least one analytical instrument 170 performing operation 356. In an embodiment, aligner 232 is implemented as computer software executing on a computer system, such as computer system 1000 as shown in FIG. 10, such that the computer system performs operation 356. In an embodiment, aligner 232 is implemented as computer software executing on a computer system, such as computer system/server 1012 as shown in FIG. 10, such that the computer system performs operation 356. In an embodiment, aligner 232 is implemented as computer software executing on a computer system, such as processing unit 1016 as shown in FIG. 10, such that the computer system performs operation 356. In an embodiment, aligner 232 is implemented as computer software executing on a computer system, such as a processor of at least one analytical instrument 170, such that the computer system performs operation 356. In an embodiment, aligner 232 performs operation 356 as computer software executing on a processor of aligner 232. In an embodiment, aligner 232 performs operation 356 as computer software executing on a processor of at least one analytical instrument 170.

In an alternative embodiment, the aligning includes (a) executing, by the computer system, a set of logical operations identifying at least one additional maximum peak value among the additional detector data with respect to the baseline, (b) calculating, by the computer system, at least one time difference between a known sample maximum peak value among the known sample data and the at least one additional maximum peak value, and (c) executing, by the computer system, a set of logical operations shifting the known sample data in time with respect to the additional detector data by the at least one time difference. In an alternative embodiment, aligning operation 212 includes (a) an operation of executing, by the computer system, a set of logical operations identifying at least one additional maximum peak value among the additional detector data with respect to the baseline, (b) an operation of calculating, by the computer system, at least one time difference between a known sample maximum peak value among the known sample data and the at least one additional maximum peak value, and (c) an operation of executing, by the computer system, a set of logical operations shifting the known sample data in time with respect to the additional detector data by the at least one time difference.

In a specific embodiment, the aligning includes (a) executing, by the computer system, a set of logical operations identifying a first maximum peak region among the known sample data, (b) executing, by the computer system, a set of logical operations identifying a first maximum value in the first maximum peak region, (c) executing, by the computer system, a set of logical operations identifying a second maximum peak region among the additional detector data, (d) executing, by the computer system, a set of logical operations identifying a second maximum value in the second maximum peak region, (e) executing, by the computer system, a set of logical operations identifying a first time position of the first maximum value, (f) executing, by the computer system, a set of logical operations identifying a second time position of the second maximum value, (g) calculating, by the computer system, a time difference between the first time position and the second time position, and (h) shifting the additional detector data in time with respect to the known sample data by the time difference. In a specific embodiment, aligning operation 212 includes (a) an operation of executing, by the computer system, a set of logical operations identifying a first maximum peak region among the known sample data, (b) an operation of executing, by the computer system, a set of logical operations identifying a first maximum value in the first maximum peak region, (c) an operation of executing, by the computer system, a set of logical operations identifying a second maximum peak region among the additional detector data, (d) an operation of executing, by the computer system, a set of logical operations identifying a second maximum value in the second maximum peak region, (e) an operation of executing, by the computer system, a set of logical operations identifying a first time position of the first maximum value, (f) an operation of executing, by the computer system, a set of logical operations identifying a second time position of the second maximum value, (g) an operation of calculating, by the computer system, a time difference between the first time position and the second time position, and (h) an operation of shifting the additional detector data in time with respect to the known sample data by the time difference.

In a specific embodiment, the aligning includes (a) executing, by the computer system, a set of logical operations identifying a first maximum peak region among the known sample data, (b) executing, by the computer system, a set of logical operations identifying a first maximum value in the first maximum peak region, (c) executing, by the computer system, a set of logical operations identifying a second maximum peak region among the additional detector data, (d) executing, by the computer system, a set of logical operations identifying a second maximum value in the second maximum peak region, (e) executing, by the computer system, a set of logical operations identifying a first time position of the first maximum value, (f) executing, by the computer system, a set of logical operations identifying a second time position of the second maximum value, (g) calculating, by the computer system, a time difference between the first time position and the second time position, and (h) shifting the known sample data in time with respect to the additional detector data by the time difference. In a specific embodiment, aligning operation 212 includes (a) an operation of executing, by the computer system, a set of logical operations identifying a first maximum peak region among the known sample data, (b) an operation of executing, by the computer system, a set of logical operations identifying a first maximum value in the first maximum peak region, (c) an operation of executing, by the computer system, a set of logical operations identifying a second maximum peak region among the additional detector data, (d) an operation of executing, by the computer system, a set of logical operations identifying a second maximum value in the second maximum peak region, (e) an operation of executing, by the computer system, a set of logical operations identifying a first time position of the first maximum value, (f) an operation of executing, by the computer system, a set of logical operations identifying a second time position of the second maximum value, (g) an operation of calculating, by the computer system, a time difference between the first time position and the second time position, and (h) an operation of shifting the known sample data in time with respect to the additional detector data by the time difference.

Band-Broadening Aligned Sample Data

In an embodiment, the band-broadening includes executing, by the computer system, a set of logical operations fitting the additional detector data to a band-broadening software kernel, thereby broadening the additional detector data to match a width of the data collected by the at least one analytical instrument. In an embodiment, band-broadening operation 214 includes an operation of executing, by the computer system, a set of logical operations fitting the additional detector data to a band-broadening software kernel, thereby broadening the additional detector data to match a width of the data collected by the at least one analytical instrument. In an embodiment, band-broadener 234 is configured to execute a set of logical operations fitting additional detector data 254 to a band-broadening software kernel, thereby broadening additional detector data 254 to match a width of the data collected by at least one analytical instrument 170. In an embodiment, band-broadening operation 214 applies a band-broadening procedure, such as the band-broadening technique disclosed by U.S. Pat. Nos. 7,386,427 and/or 7,911,594, to aligned sample data 262 to correct for the effects of inter-detector band-broadening. In an embodiment, band-broadening operation 214 artificially broadens data from instruments earlier in the instrument chain with a gaussian convolved exponential kernel (i.e., a nonlinear fitting procedure) such that time slices of data from all instruments in the detector chain are synchronized, where the alignment results (i.e., aligned sample data) are used as a seed for one parameter in this nonlinear fitting procedure, resulting in the signals from all detectors in the analytical chain overlapping temporally (i.e., band-broadened sample data).

In an embodiment, band-broadener 234 includes a computer system, such as computer system 1000 as shown in FIG. 10, performing an operation of executing a set of logical operations fitting additional detector data 254 to a band-broadening software kernel, thereby broadening additional detector data 254 to match a width of the data collected by at least one analytical instrument 170. In an embodiment, band-broadener 234 includes a computer system, such as computer system/server 1012 as shown in FIG. 10, performing an operation of executing a set of logical operations fitting additional detector data 254 to a band-broadening software kernel, thereby broadening additional detector data 254 to match a width of the data collected by at least one analytical instrument 170. In an embodiment, band-broadener 234 includes a computer system, such as processing unit 1016 as shown in FIG. 10, performing an operation of executing a set of logical operations fitting additional detector data 254 to a band-broadening software kernel, thereby broadening additional detector data 254 to match a width of the data collected by at least one analytical instrument 170. In an embodiment, band-broadener 234 is a processor of at least one analytical instrument 170 performing an operation of executing a set of logical operations fitting additional detector data 254 to a band-broadening software kernel, thereby broadening additional detector data 254 to match a width of the data collected by at least one analytical instrument 170.

In an embodiment, band-broadener 234 is implemented as computer software executing on a computer system, such as computer system 1000 as shown in FIG. 10, such that the computer system performs an operation of executing a set of logical operations fitting additional detector data 254 to a band-broadening software kernel, thereby broadening additional detector data 254 to match a width of the data collected by at least one analytical instrument 170. In an embodiment, band-broadener 234 is implemented as computer software executing on a computer system, such as computer system/server 1012 as shown in FIG. 10, such that the computer system performs an operation of executing a set of logical operations fitting additional detector data 254 to a band-broadening software kernel, thereby broadening additional detector data 254 to match a width of the data collected by at least one analytical instrument 170. In an embodiment, band-broadener 234 is implemented as computer software executing on a computer system, such as processing unit 1016 as shown in FIG. 10, such that the computer system performs an operation of executing a set of logical operations fitting additional detector data 254 to a band-broadening software kernel, thereby broadening additional detector data 254 to match a width of the data collected by at least one analytical instrument 170. In an embodiment, band-broadener 234 is implemented as computer software executing on a computer system, such as a processor of at least one analytical instrument 170, such that the computer system performs an operation of executing a set of logical operations fitting additional detector data 254 to a band-broadening software kernel, thereby broadening additional detector data 254 to match a width of the data collected by at least one analytical instrument 170. In an embodiment, band-broadener 234 performs an operation of executing a set of logical operations fitting additional detector data 254 to a band-broadening software kernel, thereby broadening additional detector data 254 to match a width of the data collected by at least one analytical instrument 170 as computer software executing on a processor of band-broadener 234. In an embodiment, band-broadener 234 performs an operation of executing a set of logical operations fitting additional detector data 254 to a band-broadening software kernel, thereby broadening additional detector data 254 to match a width of the data collected by at least one analytical instrument 170 as computer software executing on a processor of at least one analytical instrument 170.

Normalizing Known Sample Data

In a further embodiment, the processing further includes executing, by the computer system, a set of logical operations normalizing the known sample data with respect to the baseline and a known sample maximum peak value among the known sample data. In a further embodiment, processing operation 114 further includes an operation of executing, by the computer system, a set of logical operations normalizing the known sample data with respect to the baseline and a known sample maximum peak value among the known sample data. In an embodiment, the known sample data is collected by a light scattering instrument. In a particular embodiment, the light scattering instrument is a MALS detector. In a further embodiment, method processer 134 is further configured to execute a set of logical operations normalizing known sample data 162 with respect to baseline 250 and a known sample maximum peak value among known sample data 162. In an embodiment, the at least one analytical instrument 170 is a MALS detector. In an embodiment, processing operation 114 normalizes the known sample data by analyzing data from an isotropic scatterer that scatters light with the same intensity at every angle, collecting data from all angles with the MALS detector, calculating a normalization factor for each detector of the MALS detector based on the 90° angle detector of the MALS detector. (Detector 11 in Table 1), and applying the normalization factors to the respective detectors of the MALS detector.

In an embodiment, method processer 134 includes a computer system, such as computer system 1000 as shown in FIG. 10, performing an operation of executing a set of logical operations normalizing known sample data 162 with respect to baseline 250 and a known sample maximum peak value among known sample data 162. In an embodiment, method processer 134 includes a computer system, such as computer system/server 1012 as shown in FIG. 10, performing an operation of executing a set of logical operations normalizing known sample data 162 with respect to baseline 250 and a known sample maximum peak value among known sample data 162. In an embodiment, method processer 134 includes a computer system, such as processing unit 1016 as shown in FIG. 10, performing an operation of executing a set of logical operations normalizing known sample data 162 with respect to baseline 250 and a known sample maximum peak value among known sample data 162. In an embodiment, method processer 134 is a processor of at least one analytical instrument 170 performing an operation of executing a set of logical operations normalizing known sample data 162 with respect to baseline 250 and a known sample maximum peak value among known sample data 162.

In an embodiment, method processer 134 is implemented as computer software executing on a computer system, such as computer system 1000 as shown in FIG. 10, such that the computer system performs an operation of executing a set of logical operations normalizing known sample data 162 with respect to baseline 250 and a known sample maximum peak value among known sample data 162. In an embodiment, method processer 134 is implemented as computer software executing on a computer system, such as computer system/server 1012 as shown in FIG. 10, such that the computer system performs an operation of executing a set of logical operations normalizing known sample data 162 with respect to baseline 250 and a known sample maximum peak value among known sample data 162. In an embodiment, method processer 134 is implemented as computer software executing on a computer system, such as processing unit 1016 as shown in FIG. 10, such that the computer system performs an operation of executing a set of logical operations normalizing known sample data 162 with respect to baseline 250 and a known sample maximum peak value among known sample data 162. In an embodiment, method processer 134 is implemented as computer software executing on a computer system, such as a processor of at least one analytical instrument 170, such that the computer system performs an operation of executing a set of logical operations normalizing known sample data 162 with respect to baseline 250 and a known sample maximum peak value among known sample data 162. In an embodiment, method processer 134 performs an operation of executing a set of logical operations normalizing known sample data 162 with respect to baseline 250 and a known sample maximum peak value among known sample data 162 as computer software executing on a processor of method processer 134. In an embodiment, method processer 134 performs an operation of executing a set of logical operations normalizing known sample data 162 with respect to baseline 250 and a known sample maximum peak value among known sample data 162 as computer software executing on a processor of at least one analytical instrument 170.

In an embodiment, the normalizing includes dividing a signal from each photodiode detector of the at least one analytical instrument by a signal from a calibration photodiode of the at least one analytical instrument. In an embodiment, the normalizing operation includes an operation of dividing a signal from each photodiode detector of the at least one analytical instrument by a signal from a calibration photodiode of the at least one analytical instrument. In an embodiment, method processor 134 is further configured to divide a signal from each photodiode detector of at least one analytical instrument 170 by a signal from a calibration photodiode of at least one analytical instrument 170. In an embodiment, at least one analytical instrument 170 is a MALS detector. In a particular embodiment, calibration photodiode is the 90° angle detector of the MALS detector.

In an embodiment, method processor 134 includes a computer system, such as computer system 1000 as shown in FIG. 10, performing an operation of dividing a signal from each photodiode detector of at least one analytical instrument 170 by a signal from a calibration photodiode of at least one analytical instrument 170. In an embodiment, method processor 134 includes a computer system, such as computer system/server 1012 as shown in FIG. 10, performing an operation of dividing a signal from each photodiode detector of at least one analytical instrument 170 by a signal from a calibration photodiode of at least one analytical instrument 170. In an embodiment, method processor 134 includes a computer system, such as processing unit 1016 as shown in FIG. 10, performing an operation of dividing a signal from each photodiode detector of at least one analytical instrument 170 by a signal from a calibration photodiode of at least one analytical instrument 170. In an embodiment, method processor 134 is a processor of at least one analytical instrument 170 performing an operation of dividing a signal from each photodiode detector of at least one analytical instrument 170 by a signal from a calibration photodiode of at least one analytical instrument 170.

In an embodiment, method processor 134 is implemented as computer software executing on a computer system, such as computer system 1000 as shown in FIG. 10, such that the computer system performs an operation of dividing a signal from each photodiode detector of at least one analytical instrument 170 by a signal from a calibration photodiode of at least one analytical instrument 170. In an embodiment, method processor 134 is implemented as computer software executing on a computer system, such as computer system/server 1012 as shown in FIG. 10, such that the computer system performs an operation of dividing a signal from each photodiode detector of at least one analytical instrument 170 by a signal from a calibration photodiode of at least one analytical instrument 170. In an embodiment, method processer 134 is implemented as computer software executing on a computer system, such as processing unit 1016 as shown in FIG. 10, such that the computer system performs an operation of dividing a signal from each photodiode detector of at least one analytical instrument 170 by a signal from a calibration photodiode of at least one analytical instrument 170. In an embodiment, method processor 134 is implemented as computer software executing on a computer system, such as a processor of at least one analytical instrument 170, such that the computer system performs an operation of dividing a signal from each photodiode detector of at least one analytical instrument 170 by a signal from a calibration photodiode of at least one analytical instrument 170. In an embodiment, method processor 134 performs an operation of dividing a signal from each photodiode detector of at least one analytical instrument 170 by a signal from a calibration photodiode of at least one analytical instrument 170 as computer software executing on a processor of method processor 134. In an embodiment, method processor 134 performs an operation of dividing a signal from each photodiode detector of at least one analytical instrument 170 by a signal from a calibration photodiode of at least one analytical instrument 170 as computer software executing on a processor of at least one analytical instrument 170.

Storing Validated Analytical Method

In a further embodiment, the computer implemented method, the system, and the computer program product further include (a) storing alignment data corresponding to the at least one validated analytical method in a data store corresponding to the at least one incomplete analytical method, (b) storing band-broadening data corresponding to the at least one validated analytical method in the data store, and (c) storing method information corresponding to the at least one validated analytical method in the data store. In a further embodiment, the computer implemented method, the system, and the computer program product are further configured to perform (a) an operation of storing alignment data corresponding to the at least one validated analytical method in a data store corresponding to the at least one incomplete analytical method, (b) an operation of storing band-broadening data corresponding to the at least one validated analytical method in the data store, and (c) an operation of storing method information corresponding to the at least one validated analytical method in the data store. In an embodiment, the data store includes a data structure. In a specific embodiment, the data store is a data structure. In a further embodiment, the computer system is further configured (a) to store alignment data corresponding to at least one validated analytical method 164 in data store 172 corresponding to at least one incomplete analytical method 160, (b) to store band-broadening data corresponding to at least one validated analytical method 164 in data store 172, and (c) to store method information corresponding to at least one validated analytical method 164 in data store 172.

In an embodiment, the computer system includes a computer system, such as computer system 1000 as shown in FIG. 10, (a) storing alignment data corresponding to at least one validated analytical method 164 in data store 172 corresponding to at least one incomplete analytical method 160, (b) storing band-broadening data corresponding to at least one validated analytical method 164 in data store 172, and (c) storing method information corresponding to at least one validated analytical method 164 in data store 172. In an embodiment, the computer system includes a computer system, such as computer system/server 1012 as shown in FIG. 10, (a) storing alignment data corresponding to at least one validated analytical method 164 in data store 172 corresponding to at least one incomplete analytical method 160, (b) storing band-broadening data corresponding to at least one validated analytical method 164 in data store 172, and (c) storing method information corresponding to at least one validated analytical method 164 in data store 172. In an embodiment, the computer system includes a computer system, such as processing unit 1016 as shown in FIG. 10, (a) storing alignment data corresponding to at least one validated analytical method 164 in data store 172 corresponding to at least one incomplete analytical method 160, (b) storing band-broadening data corresponding to at least one validated analytical method 164 in data store 172, and (c) storing method information corresponding to at least one validated analytical method 164 in data store 172. In an embodiment, the computer system is a processor of at least one analytical instrument 170, (a) storing alignment data corresponding to at least one validated analytical method 164 in data store 172 corresponding to at least one incomplete analytical method 160, (b) storing band-broadening data corresponding to at least one validated analytical method 164 in data store 172, and (c) storing method information corresponding to at least one validated analytical method 164 in data store 172.

In an embodiment, the computer system is implemented as computer software executing on a computer system, such as computer system 1000 as shown in FIG. 10, such that the computer system (a) stores alignment data corresponding to at least one validated analytical method 164 in data store 172 corresponding to at least one incomplete analytical method 160, (b) stores band-broadening data corresponding to at least one validated analytical method 164 in data store 172, and (c) stores method information corresponding to at least one validated analytical method 164 in data store 172. In an embodiment, the computer system is implemented as computer software executing on a computer system, such as computer system/server 1012 as shown in FIG. 10, such that the computer system (a) stores alignment data corresponding to at least one validated analytical method 164 in data store 172 corresponding to at least one incomplete analytical method 160, (b) stores band-broadening data corresponding to at least one validated analytical method 164 in data store 172, and (c) stores method information corresponding to at least one validated analytical method 164 in data store 172. In an embodiment, the computer system is implemented as computer software executing on a computer system, such as processing unit 1016 as shown in FIG. 10, such that the computer system (a) stores alignment data corresponding to at least one validated analytical method 164 in data store 172 corresponding to at least one incomplete analytical method 160, (b) stores band-broadening data corresponding to at least one validated analytical method 164 in data store 172, and (c) stores method information corresponding to at least one validated analytical method 164 in data store 172. In an embodiment, the computer system is implemented as computer software executing on a computer system, such as a processor of at least one analytical instrument 170, such that the computer system (a) stores alignment data corresponding to at least one validated analytical method 164 in data store 172 corresponding to at least one incomplete analytical method 160, (b) stores band-broadening data corresponding to at least one validated analytical method 164 in data store 172, and (c) stores method information corresponding to at least one validated analytical method 164 in data store 172.

In an embodiment, the computer system (a) stores alignment data corresponding to at least one validated analytical method 164 in data store 172 corresponding to at least one incomplete analytical method 160, (b) stores band-broadening data corresponding to at least one validated analytical method 164 in data store 172, and (c) stores method information corresponding to at least one validated analytical method 164 in data store 172, as computer software executing on a processor of the computer system. In an embodiment, the computer system (a) stores alignment data corresponding to at least one validated analytical method 164 in data store 172 corresponding to at least one incomplete analytical method 160, (b) stores band-broadening data corresponding to at least one validated analytical method 164 in data store 172, and (c) stores method information corresponding to at least one validated analytical method 164 in data store 172, as computer software executing on a processor of at least one analytical instrument 170.

In a further embodiment, the computer implemented method, the system, and the computer program product further include storing normalization data corresponding to the at least one validated analytical method in the data store. In a further embodiment, the computer implemented method, the system, and the computer program product are further configured to perform an operation of storing normalization data corresponding to the at least one validated analytical method in the data store. In a further embodiment, the computer system is further configured to store normalization data corresponding to at least one validated analytical method 164 in data store 172.

In an embodiment, the computer system includes a computer system, such as computer system 1000 as shown in FIG. 10, storing normalization data corresponding to at least one validated analytical method 164 in data store 172. In an embodiment, the computer system includes a computer system, such as computer system/server 1012 as shown in FIG. 10, storing normalization data corresponding to at least one validated analytical method 164 in data store 172. In an embodiment, the computer system includes a computer system, such as processing unit 1016 as shown in FIG. 10, storing normalization data corresponding to at least one validated analytical method 164 in data store 172. In an embodiment, the computer system is a processor of at least one analytical instrument 170, storing normalization data corresponding to at least one validated analytical method 164 in data store 172.

In an embodiment, the computer system is implemented as computer software executing on a computer system, such as computer system 1000 as shown in FIG. 10, such that the computer system stores normalization data corresponding to at least one validated analytical method 164 in data store 172. In an embodiment, the computer system is implemented as computer software executing on a computer system, such as computer system/server 1012 as shown in FIG. 10, such that the computer system stores normalization data corresponding to at least one validated analytical method 164 in data store 172. In an embodiment, the computer system is implemented as computer software executing on a computer system, such as processing unit 1016 as shown in FIG. 10, such that the computer system stores normalization data corresponding to at least one validated analytical method 164 in data store 172. In an embodiment, the computer system is implemented as computer software executing on a computer system, such as a processor of at least one analytical instrument 170, such that the computer system stores normalization data corresponding to at least one validated analytical method 164 in data store 172.

In an embodiment, the computer system stores normalization data corresponding to at least one validated analytical method 164 in data store 172, as computer software executing on a processor of the computer system. In an embodiment, the computer system stores normalization data corresponding to at least one validated analytical method 164 in data store 172, as computer software executing on a processor of at least one analytical instrument 170.

Invalidating Analytical Method

Figure 4A:
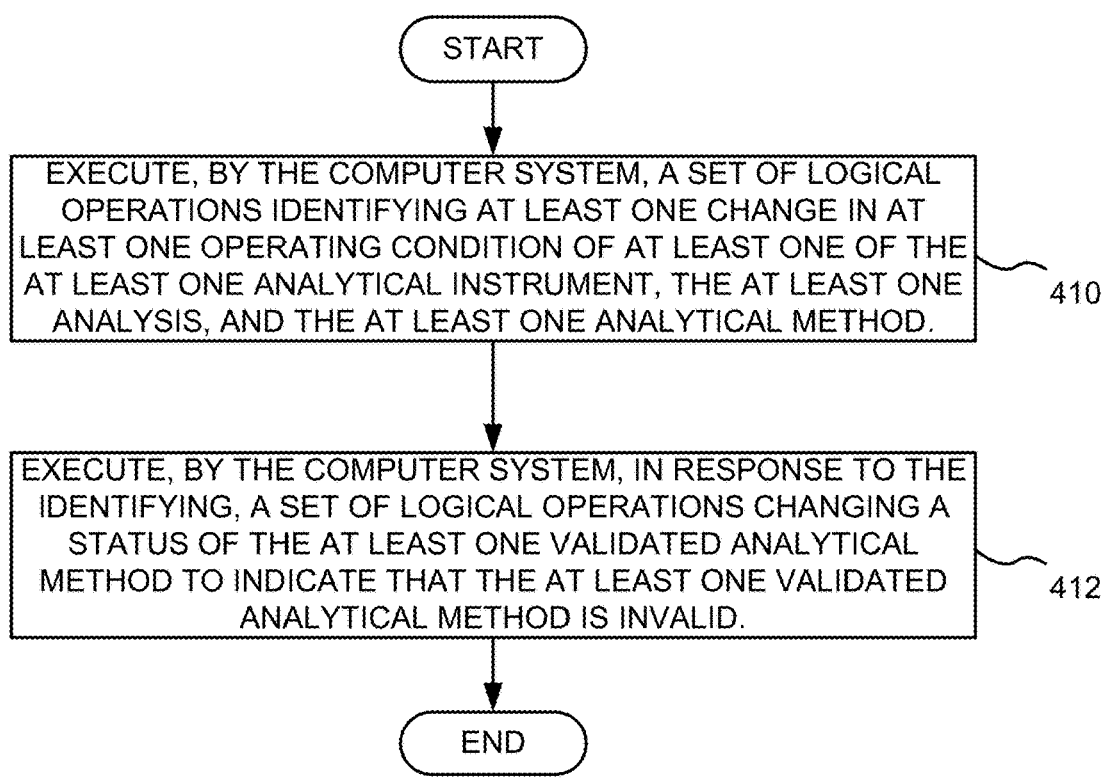
FIG. 4A depicts a flowchart in accordance with an exemplary embodiment.

In a further embodiment, the computer implemented method, the system, and the computer program product further include (a) executing, by the computer system, a set of logical operations identifying at least one change in at least one operating condition of at least one of the at least one analytical instrument, the at least one analysis, and the at least one analytical method, and (b) executing, by the computer system, in response to the identifying, a set of logical operations changing a status of the at least one validated analytical method to indicate that the at least one validated analytical method is invalid. Referring to FIG. 4A, the computer implemented method, the system, and the computer program product are further configured to perform an operation 410 of executing, by the computer system, a set of logical operations identifying at least one change in at least one operating condition of at least one of the at least one analytical instrument, the at least one analysis, and the at least one analytical method, and an operation 412 of executing, by the computer system, in response to the identifying, a set of logical operations changing a status of the at least one validated analytical method to indicate that the at least one validated analytical method is invalid. In an embodiment, the at least one operating condition includes at least one of an age of the at least one validated analytical method, a flow rate in flow data among the set-up information, an operating temperature corresponding to the at least one analytical instrument, a solvent to be used in the at least one analytical instrument, a configuration of the at least one analytical instrument, and a fluid path connection involving the at least one analytical instrument.

In an embodiment, the computer system is a computer system 1000 as shown in FIG. 10, that executes an analyzing data collected by analytical instruments script or computer software application that carries out the operations of at least method 400. In an embodiment, the computer system is a computer system/server 1012 as shown in FIG. 10, that executes an analyzing data collected by analytical instruments script or computer software application that carries out the operations of at least method 400. In an embodiment, the computer system is a processing unit 1016 as shown in FIG. 10, that executes an analyzing data collected by analytical instruments script or computer software application that carries out the operations of at least method 400. In an embodiment, the computer system is a processor of the analytical instrument, that executes an analyzing data collected by analytical instruments script or computer software application that carries out the operations of at least method 400.

In an embodiment, the computer system is a computer system 1000 as shown in FIG. 10, that executes an analyzing data collected by analytical instruments script or computer software application that carries out at least operations 410 and 412. In an embodiment, the computer system is a computer system/server 1012 as shown in FIG. 10, that executes an in analyzing data collected by analytical instruments script or computer software application that carries out at least operations 410 and 412. In an embodiment, the computer system is a processing unit 1016 as shown in FIG. 10, that executes an analyzing data collected by analytical instruments script or computer software application that carries out at least operations 410 and 412. In an embodiment, the computer system is a processor of the analytical instrument, that executes an analyzing data collected by analytical instruments script or computer software application that carries out at least operations 410 and 412.

Figure 4B:
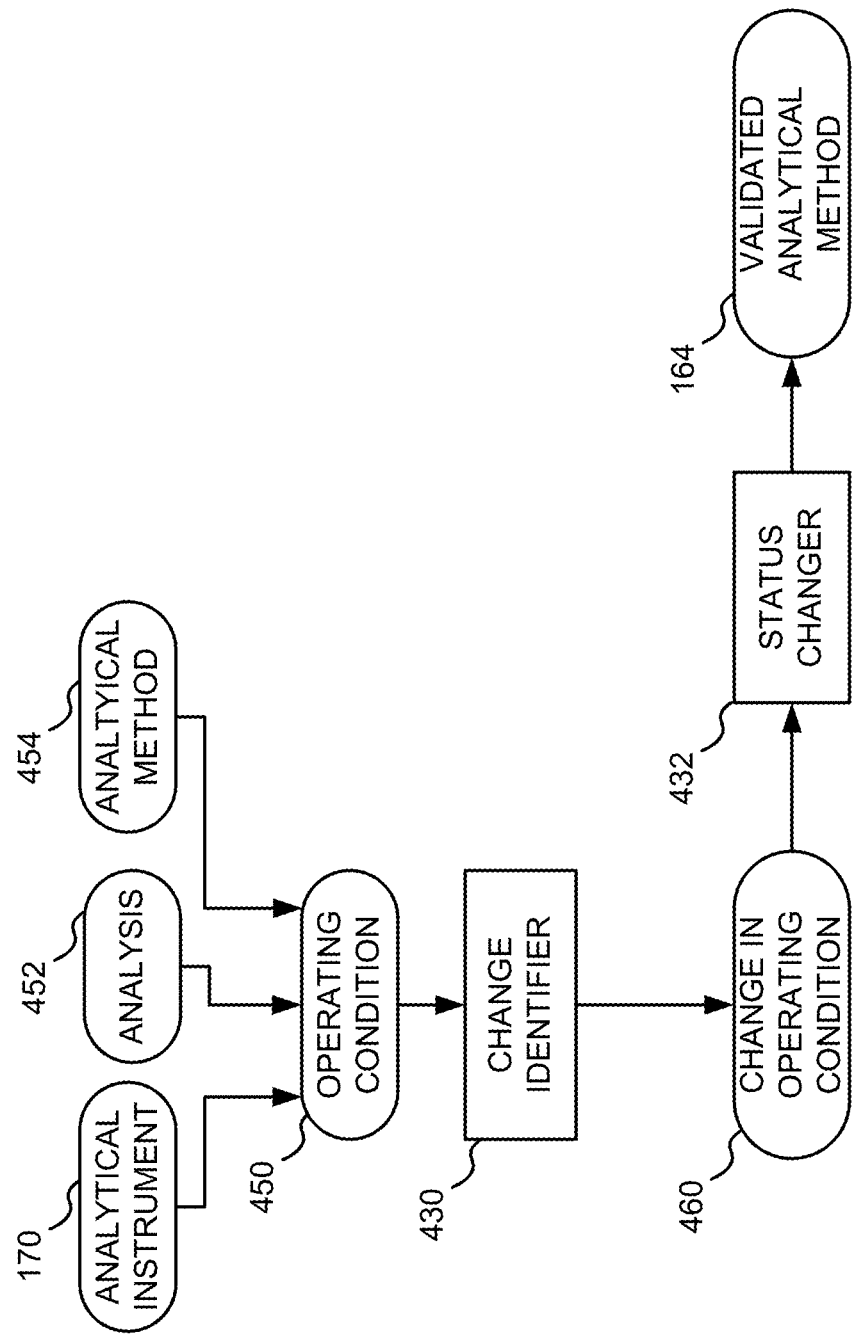
FIG. 4B depicts a block diagram in accordance with an exemplary embodiment.

Referring to FIG. 4B, in an exemplary embodiment, the computer implemented method, the system, and the computer program product include an change identifier 430 and a status changer 432. In an embodiment, change identifier 430 is configured to execute a set of logical operations identifying at least one change 460 in at least one operating condition 450 of at least one of at least one analytical instrument 170, the at least one analysis 452, and the at least one analytical method 454. In an embodiment, change identifier 430 includes a computer system, such as computer system 1000 as shown in FIG. 10, performing operation 410. In an embodiment, change identifier 430 includes a computer system, such as computer system/server 1012 as shown in FIG. 10, performing operation 410. In an embodiment, change identifier 430 includes a computer system, such as processing unit 1016 as shown in FIG. 10, performing operation 410. In an embodiment, change identifier 430 is implemented as computer software executing on a computer system, such as computer system 1000 as shown in FIG. 10, such that the computer system performs operation 410. In an embodiment, change identifier 430 is implemented as computer software executing on a computer system, such as computer system/server 1012 as shown in FIG. 10, such that the computer system performs operation 410. In an embodiment, change identifier 430 is implemented as computer software executing on a computer system, such as processing unit 1016 as shown in FIG. 10, such that the computer system performs operation 410. In an embodiment, change identifier 430 performs operation 410 as computer software executing on a processor of change identifier 430.

In an embodiment, status changer 432 is configured to execute, in response to the identifying, a set of logical operations changing a status of at least one validated analytical method 164 to indicate that at least one validated analytical method 164 is invalid. In an embodiment, status changer 432 includes a computer system, such as computer system 1000 as shown in FIG. 10, performing operation 412. In an embodiment, status changer 432 includes a computer system, such as computer system/server 1012 as shown in FIG. 10, performing operation 412. In an embodiment, status changer 432 includes a computer system, such as processing unit 1016 as shown in FIG. 10, performing operation 412. In an embodiment, status changer 432 is implemented as computer software executing on a computer system, such as computer system 1000 as shown in FIG. 10, such that the computer system performs operation 412. In an embodiment, status changer 432 is implemented as computer software executing on a computer system, such as computer system/server 1012 as shown in FIG. 10, such that the computer system performs operation 412. In an embodiment, status changer 432 is implemented as computer software executing on a computer system, such as processing unit 1016 as shown in FIG. 10, such that the computer system performs operation 412. In an embodiment, status changer 432 performs operation 412 as computer software executing on a processor of status changer 432.

In a further embodiment, the computer implemented method, the system, and the computer program product further include (a) executing, by the computer system, in response to the changing, a set of logical operations reprocessing the at least one incomplete analytical method with respect to the known sample data, resulting in at least one revalidated analytical method, and (b) executing, by the computer system, a set of logical operations running the at least one revalidated analytical method on the at least one unknown sample on the at least one analytical instrument with respect to the set-up information, resulting in re-analyzed sample data. In a further embodiment, the computer implemented method, the system, and the computer program product are further configured to perform (a) an operation of executing, by the computer system, in response to the changing, a set of logical operations reprocessing the at least one incomplete analytical method with respect to the known sample data, resulting in at least one revalidated analytical method, and (b) an operation of executing, by the computer system, a set of logical operations running the at least one revalidated analytical method on the at least one unknown sample on the at least one analytical instrument with respect to the set-up information, resulting in re-analyzed sample data.

In a further embodiment, the computer system is further configured (a) to execute, in response to the changing, a set of logical operations reprocessing at least one incomplete analytical method 160 with respect to known sample data 162, resulting in at least one revalidated analytical method, and (b) to execute a set of logical operations running the at least one revalidated analytical method on at least one unknown sample 156 on at least one analytical instrument 170 with respect to set-up information 150, resulting in re-analyzed sample data. In an embodiment, the computer system includes a computer system, such as computer system 1000 as shown in FIG. 10, (a) executing, in response to the changing, a set of logical operations reprocessing at least one incomplete analytical method 160 with respect to known sample data 162, resulting in at least one revalidated analytical method, and (b) executing a set of logical operations running the at least one revalidated analytical method on at least one unknown sample 156 on at least one analytical instrument 170 with respect to set-up information 150, resulting in re-analyzed sample data. In an embodiment, the computer system includes a computer system, such as computer system/server 1012 as shown in FIG. 10, (a) executing, in response to the changing, a set of logical operations reprocessing at least one incomplete analytical method 160 with respect to known sample data 162, resulting in at least one revalidated analytical method, and (b) executing a set of logical operations running the at least one revalidated analytical method on at least one unknown sample 156 on at least one analytical instrument 170 with respect to set-up information 150, resulting in re-analyzed sample data. In an embodiment, the computer system includes a computer system, such as processing unit 1016 as shown in FIG. 10, (a) executing, in response to the changing, a set of logical operations reprocessing at least one incomplete analytical method 160 with respect to known sample data 162, resulting in at least one revalidated analytical method, and (b) executing a set of logical operations running the at least one revalidated analytical method on at least one unknown sample 156 on at least one analytical instrument 170 with respect to set-up information 150, resulting in re-analyzed sample data. In an embodiment, the computer system is a processor of at least one analytical instrument 170, (a) executing, in response to the changing, a set of logical operations reprocessing at least one incomplete analytical method 160 with respect to known sample data 162, resulting in at least one revalidated analytical method, and (b) executing a set of logical operations running the at least one revalidated analytical method on at least one unknown sample 156 on at least one analytical instrument 170 with respect to set-up information 150, resulting in re-analyzed sample data.

In an embodiment, the computer system is implemented as computer software executing on a computer system, such as computer system 1000 as shown in FIG. 10, such that the computer system (a) executes, in response to the changing, a set of logical operations reprocessing at least one incomplete analytical method 160 with respect to known sample data 162, resulting in at least one revalidated analytical method, and (b) executes a set of logical operations running the at least one revalidated analytical method on at least one unknown sample 156 on at least one analytical instrument 170 with respect to set-up information 150, resulting in re-analyzed sample data. In an embodiment, the computer system is implemented as computer software executing on a computer system, such as computer system/server 1012 as shown in FIG. 10, such that the computer system (a) executes, in response to the changing, a set of logical operations reprocessing at least one incomplete analytical method 160 with respect to known sample data 162, resulting in at least one revalidated analytical method, and (b) executes a set of logical operations running the at least one revalidated analytical method on at least one unknown sample 156 on at least one analytical instrument 170 with respect to set-up information 150, resulting in re-analyzed sample data. In an embodiment, the computer system is implemented as computer software executing on a computer system, such as processing unit 1016 as shown in FIG. 10, such that the computer system (a) executes, in response to the changing, a set of logical operations reprocessing at least one incomplete analytical method 160 with respect to known sample data 162, resulting in at least one revalidated analytical method, and (b) executes a set of logical operations running the at least one revalidated analytical method on at least one unknown sample 156 on at least one analytical instrument 170 with respect to set-up information 150, resulting in re-analyzed sample data. In an embodiment, the computer system is implemented as computer software executing on a computer system, such as a processor of at least one analytical instrument 170, such that the computer system (a) executes, in response to the changing, a set of logical operations reprocessing at least one incomplete analytical method 160 with respect to known sample data 162, resulting in at least one revalidated analytical method, and (b) executes a set of logical operations running the at least one revalidated analytical method on at least one unknown sample 156 on at least one analytical instrument 170 with respect to set-up information 150, resulting in re-analyzed sample data.

In an embodiment, the computer system (a) executes, in response to the changing, a set of logical operations reprocessing at least one incomplete analytical method 160 with respect to known sample data 162, resulting in at least one revalidated analytical method, and (b) executes a set of logical operations running the at least one revalidated analytical method on at least one unknown sample 156 on at least one analytical instrument 170 with respect to set-up information 150, resulting in re-analyzed sample data, as computer software executing on a processor of the computer system. In an embodiment, the computer system (a) executes, in response to the changing, a set of logical operations reprocessing at least one incomplete analytical method 160 with respect to known sample data 162, resulting in at least one revalidated analytical method, and (b) executes a set of logical operations running the at least one revalidated analytical method on at least one unknown sample 156 on at least one analytical instrument 170 with respect to set-up information 150, resulting in re-analyzed sample data, as computer software executing on a processor of at least one analytical instrument 170.

In a further embodiment, the computer implemented method, the system, and the computer program product further include storing, by the computer system, the at least one revalidated analytical method in the data store. In a further embodiment, the computer implemented method, the system, and the computer program product are further configured to perform an operation of storing, by the computer system, the at least one revalidated analytical method in the data store. In a further embodiment, the computer system is further configured store the at least one revalidated analytical method in data store 172.

In an embodiment, the computer system includes a computer system, such as computer system 1000 as shown in FIG. 10, storing the at least one revalidated analytical method in data store 172. In an embodiment, the computer system includes a computer system, such as computer system/server 1012 as shown in FIG. 10, storing the at least one revalidated analytical method in data store 172. In an embodiment, the computer system includes a computer system, such as processing unit 1016 as shown in FIG. 10, storing the at least one revalidated analytical method in data store 172. In an embodiment, the computer system is a processor of at least one analytical instrument 170, storing the at least one revalidated analytical method in data store 172.

In an embodiment, the computer system is implemented as computer software executing on a computer system, such as computer system 1000 as shown in FIG. 10, such that the computer system stores the at least one revalidated analytical method in data store 172. In an embodiment, the computer system is implemented as computer software executing on a computer system, such as computer system/server 1012 as shown in FIG. 10, such that the computer system stores the at least one revalidated analytical method in data store 172. In an embodiment, the computer system is implemented as computer software executing on a computer system, such as processing unit 1016 as shown in FIG. 10, such that the computer system stores the at least one revalidated analytical method in data store 172. In an embodiment, the computer system is implemented as computer software executing on a computer system, such as a processor of at least one analytical instrument 170, such that the computer system stores the at least one revalidated analytical method in data store 172.

In an embodiment, the computer system stores the at least one revalidated analytical method in data store 172. In an embodiment, the computer system stores the at least one revalidated analytical method in data store 172, as computer software executing on a processor of at least one analytical instrument 170.

Example

Running Incomplete Analytical Method

Figure 5A:
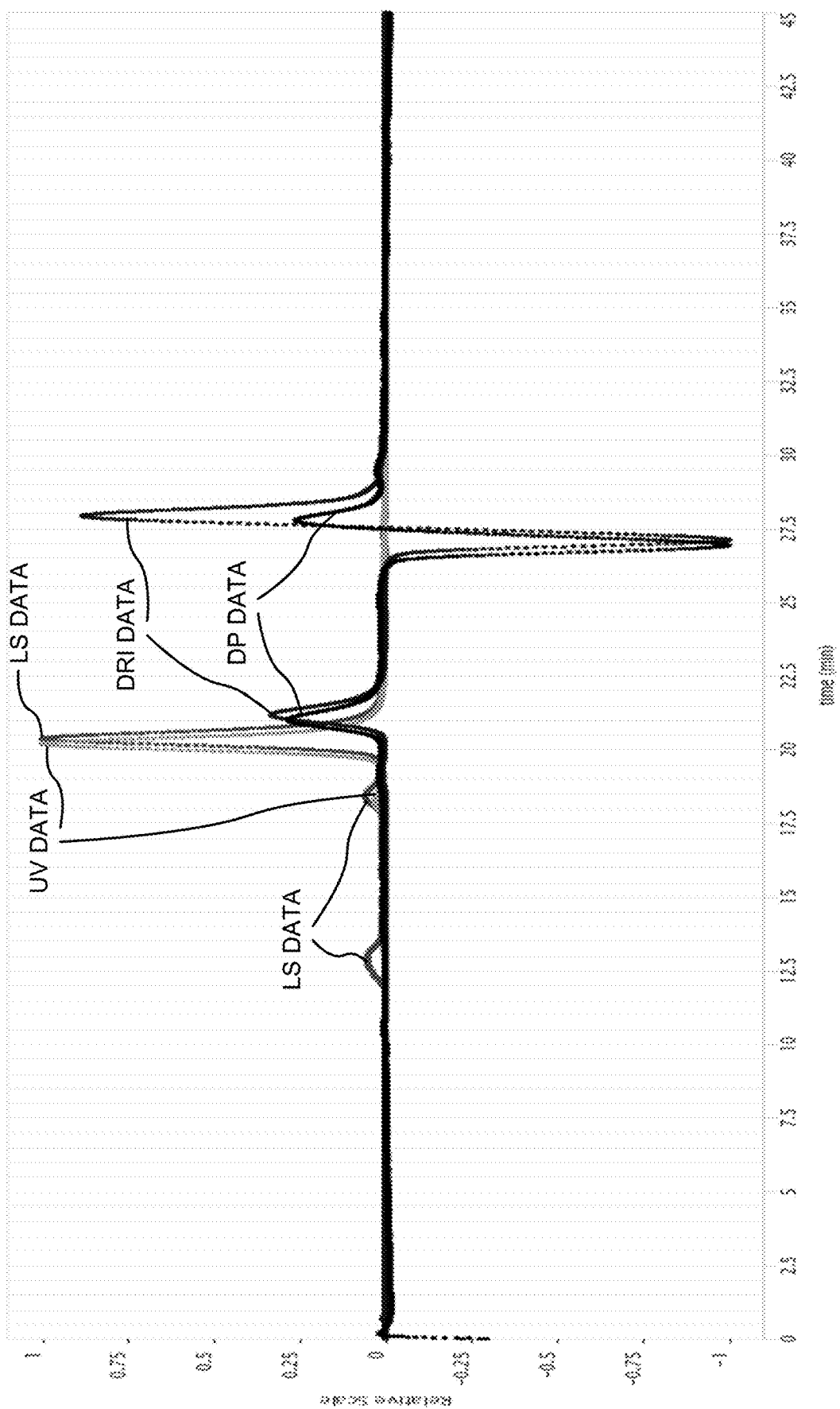
FIG. 5A depicts a graph in accordance with an embodiment.
Figure 5B:
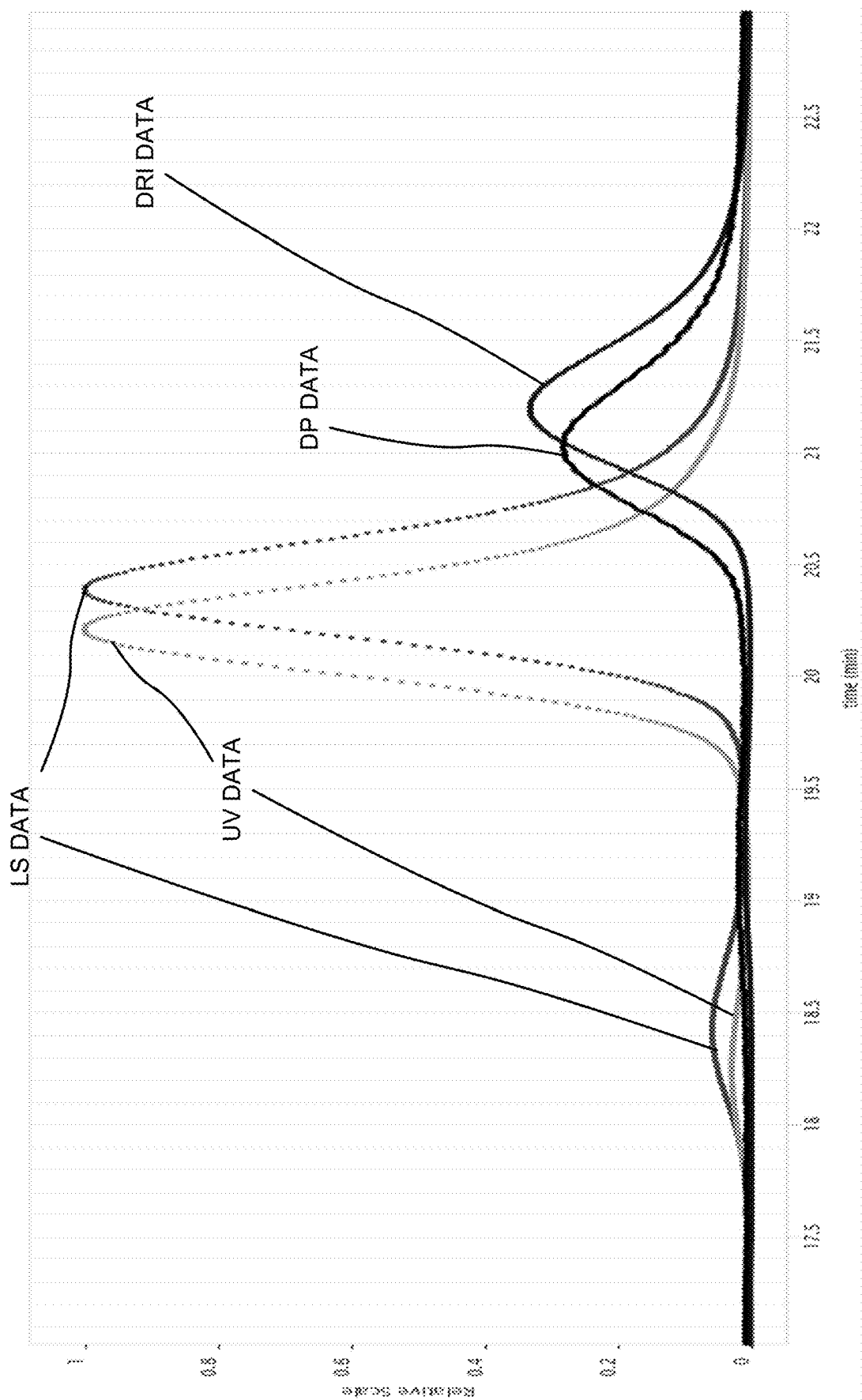
FIG. 5B depicts a graph in accordance with an embodiment.

For example, incomplete method runner 132 could generate known sample data 162 as depicted in FIG. 5A and FIG. 5B, for analytical instruments, such as an ultraviolet absorption detector/ultraviolet-visible detector (UV detector), a light scattering instrument (LS instrument), a differential refractometer (DRI instrument), and a viscometer (DP instrument). In a specific example, FIG. 5A and FIG. 5B depict the results of incomplete method runner 132 running at least one incomplete analytical method 160 on at least one known sample 154 on at least one analytical instrument (e.g., UV detector, LS instrument, DRI instrument, DP instrument) with respect to set-up information 150. Namely, FIG. 5A and FIG. 5B depict that incomplete method runner 132 could output UV data, LS data, DRI data, and DP data that are neither aligned nor band-broadened.

FIG. 5A and FIG. 5B depict the results of incomplete method runner 132 running an incomplete analytical method on a known sample on a UV detector, an LS instrument, a DRI instrument, and a DP instrument. FIG. 5A and FIG. 5B depict the results of the results of the computer implemented method, system, and computer program product running an incomplete analytical method on a known sample on a UV detector, an LS instrument, a DRI instrument, and a DP instrument.

FIG. 5A and FIG. 5B depict the raw, un-modified data (e.g., known sample data) from four analytical detectors in a series (UV detector, LS instrument, DRI instrument, DP instrument). FIG. 5A and FIG. 5B illustrate an obvious time delay in the peak arrival times among the different instruments. Analysis of the data depicted in FIG. 5A and FIG. 5B without accounting for inter-detector delays and band broadening would yield very poor results.

Processing Incomplete Analytical Method

Figure 6:
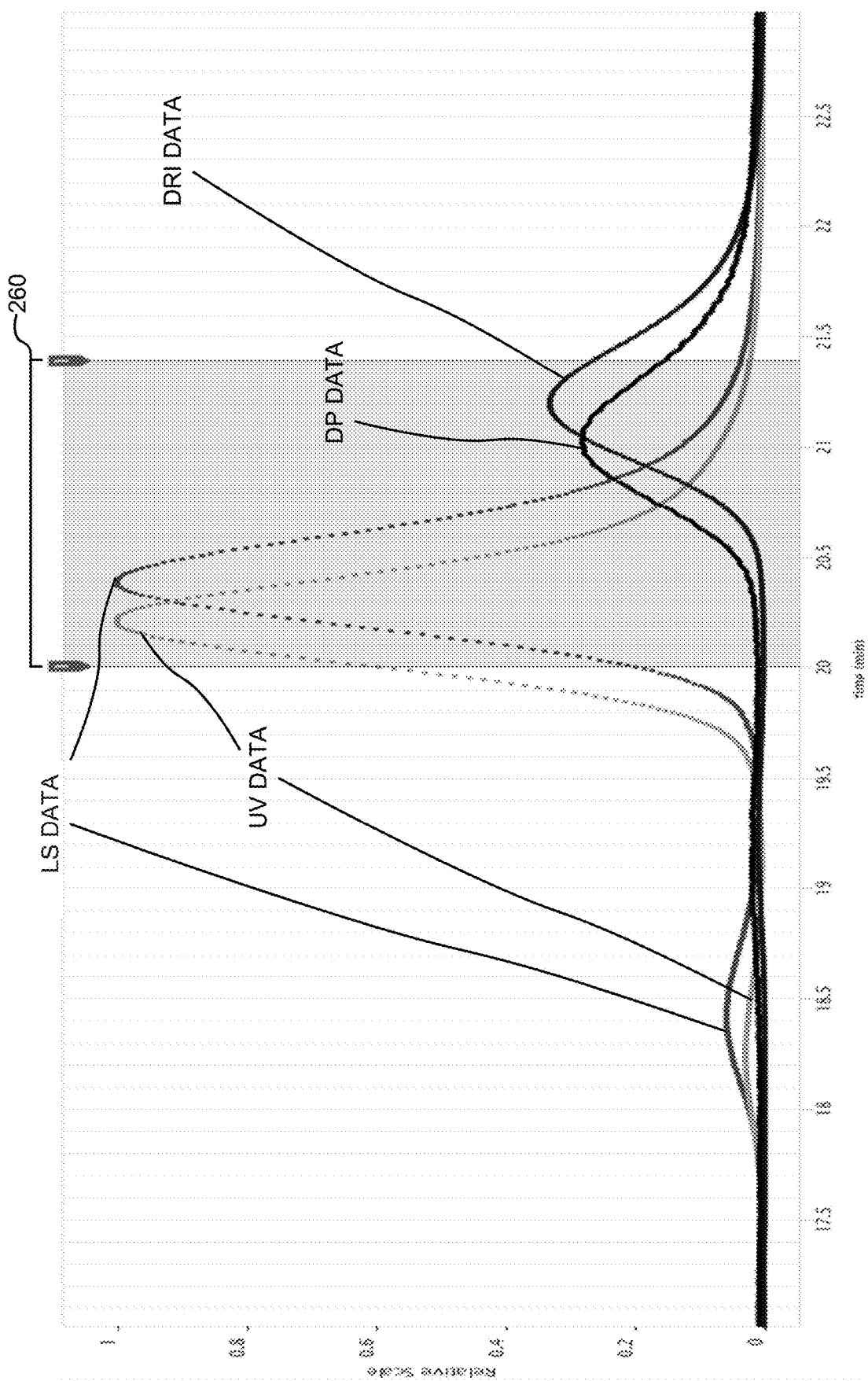
FIG. 6 depicts a graph in accordance with an embodiment
Figure 7A:
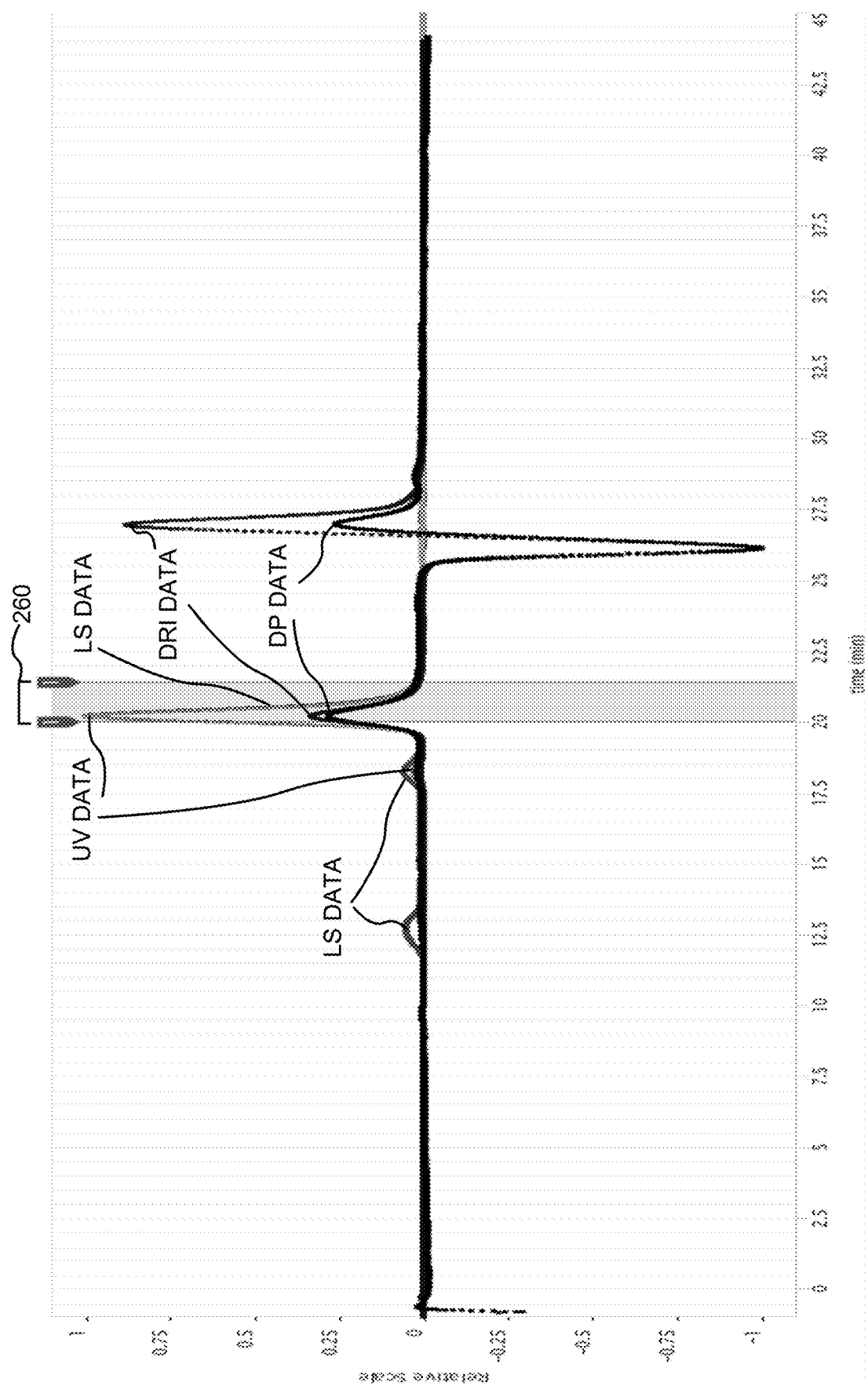
FIG. 7A depicts a graph in accordance with an embodiment.
Figure 7B:
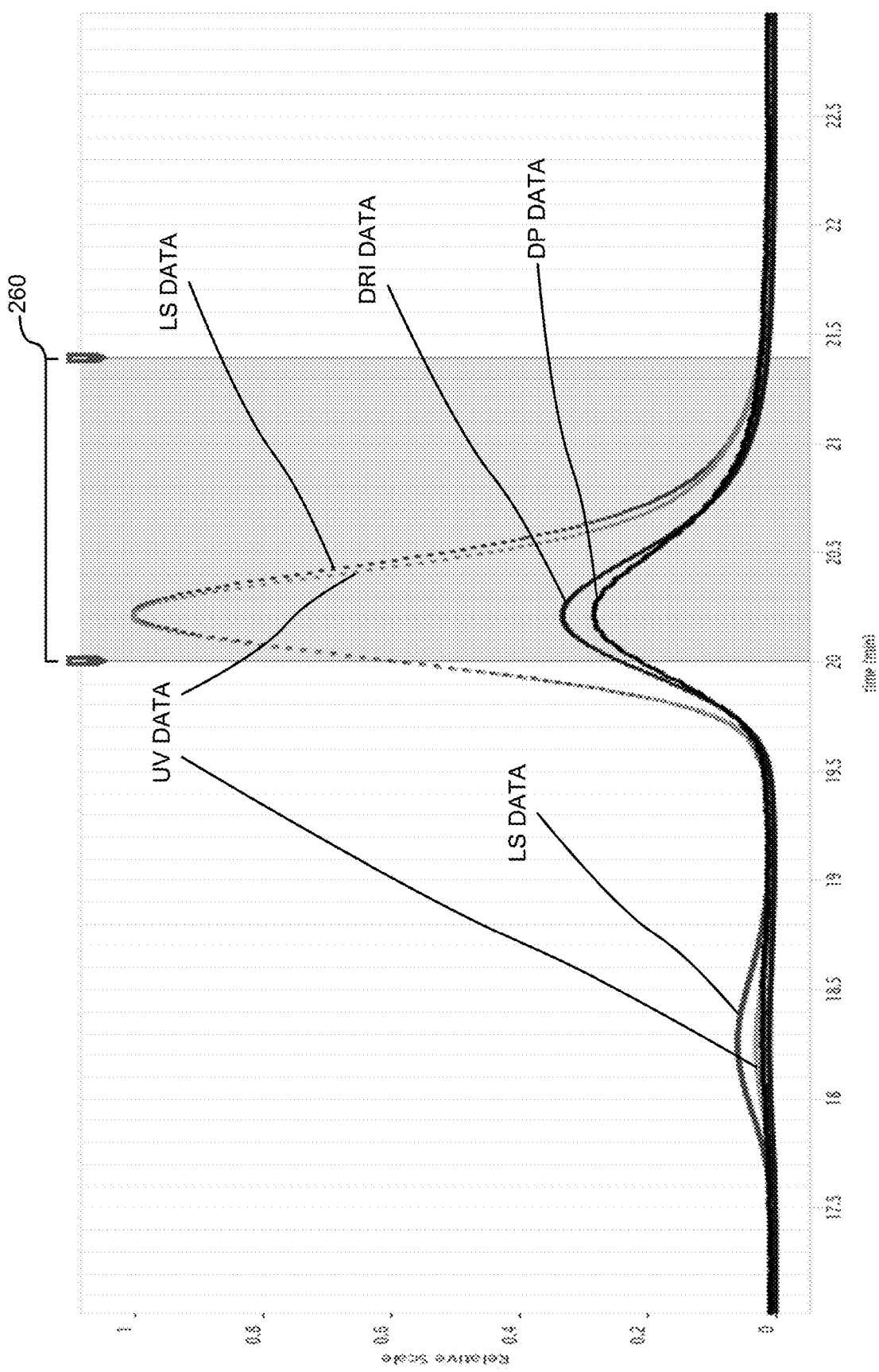
FIG. 7B depicts a graph in accordance with an embodiment.
Figure 8:
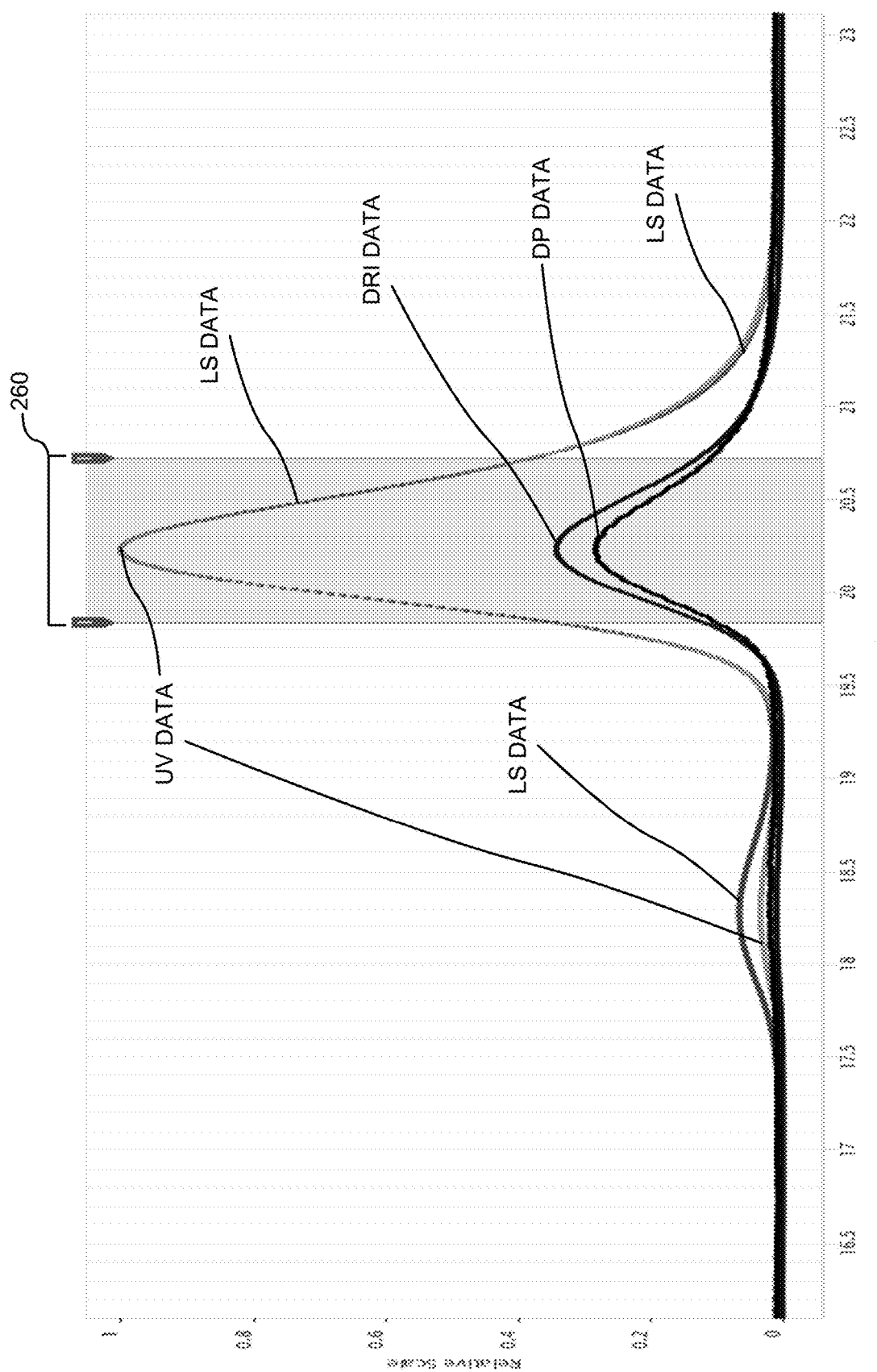
FIG. 8 depicts a graph in accordance with an embodiment

For example, method processer 134 could generate known sample peak region 260 as depicted in FIG. 6, aligned sample data 262 as depicted in FIG. 7A and FIG. 7B, and band-broadened sample data 264 as depicted in FIG. 8, for analytical instruments, such as a UV detector, an LS instrument, a DRI instrument, and a DP instrument.

Defining Known Sample Peak Region

For example, definer 230 could generate known sample peak region 260 as depicted in FIG. 6 for data collected by an analytical instrument, such as a UV detector, a LS instrument, a DRI instrument, or a DP instrument. In a specific example, FIG. 6 depicts the results of definer 230 defining known sample peak region 260 (e.g., for LS data) among known sample data 162 with respect to at least one of baseline 250 among known sample data 162 and time period 252 among known sample data 161. Namely, FIG. 6 depicts that definer 230 could define a peak region for LS data.

FIG. 6 depicts the results of definer 230 defining a peak region for particular LS data. FIG. 6 depicts the results of the computer implemented method, system, and computer program product defining a peak region for particular LS data.

In an embodiment, definer 230 determines a peak region (i.e., known sample peak region 260) by applying a threshold to data from one analytical instrument (i.e., at least one analytical instrument 170). For example, FIG. 6 illustrates definer 230 applying a threshold to the LS data. In an embodiment, definer 230 finds a peak maximum (i.e., known sample maximum peak value) (e.g., peak maximum of the LS data) among the known sample data (i.e., known sample data 162) by stepping through the known sample data and determining when a curve representing the known sample data (e.g., LS data) transitions from increasing to decreasing. In an embodiment, definer 230 defines the peak region (i.e., known sample peak region 260) by finding time values (e.g., 20 minutes and approximately 21.4 minutes) that correspond to a certain percentage (e.g., 19% and 3%) of the peak maximum (i.e., known sample maximum peak value) (e.g., peak maximum of the LS data), such that maxima from other data traces (e.g., UV data, DRI data, DP data) fall within the defined peak region (i.e., known sample peak region 260).

Aligning Additional Detector Data

For example, aligner 232 could generate aligned sample data 262 as depicted in FIG. 7A and FIG. 7B for analytical instruments, such as a UV detector, a LS instrument, a DRI instrument, and DP instrument. In a specific example, FIG. 7A and FIG. 7B depict the results of aligner 232 aligning, with respect to known sample peak region 260 (e.g., for LS data), additional detector data 254 (e.g., UV data, DRI data, DP data) collected by at least one additional analytical instrument 270 (e.g., UV detector, DRI instrument, DP instrument) coupled to at least one analytical instrument 170 (e.g., LS instrument). Namely, FIG. 7A and FIG. 7B depict that aligner 232 could output UV data, DRI data, and DP data that are aligned with LS data.

FIG. 7A and FIG. 7B depict the results of aligner 232 aligning particular UV data, DRI data, and DP data with respect to particular LS data in a peak region (e.g., peak region defined by definer 230, as depicted in FIG. 6). FIG. 7A and FIG. 7B depict the results of the computer implemented method, system, and computer program product aligning particular UV data, DRI data, and the data with respect to particular LS data in a peak region.

In an embodiment, aligner 232 transforms the data generated by definer 230, as depicted in FIG. 6, into the aligned data (i.e., aligned sample data 262) shown in FIG. 7A and FIG. 7B. In an embodiment, aligner 232 determines the arrival time of peak maxima (i.e., at least one additional maximum peak value) from each data stream (i.e., additional detector data 254) within known sample peak region 260 defined by definer 230. In an embodiment, aligner 232 calculates the time difference between downstream instruments (i.e., at least one additional analytical instrument 270) and at least one analytical instrument 170 (e.g., a LS instrument). In an embodiment, shifting operation 356 shifts the time base of the data traces (i.e., additional detector data 254) of the downstream instruments by the calculated time difference to align the peak maxima among the various detectors.

For example, as depicted in FIG. 7B, aligner 232 could generate aligned sample data 262 where the LS data and the UV data to not completely overlap resulting in a small gap in relative intensities, most noticeably at around 20.75 minutes. Aligned sample data may not completely overlap due to peak broadening as the known sample moves through the detector chain, where instruments further down the chain would see broader signals.

Band-Broadening Sample Data

For example, band-broadener 234 could generate band-broadened sample data 264 as depicted in FIG. 8 for analytical instruments, such as a UV detector, a LS instrument, a DRI instrument, and DP instrument. In a specific example, FIG. 8 depicts the results of band-broadener 234 band-broadening aligned sample data 262 (e.g., UV data, LS data, DRI data, DP data) with respect to at least one analytical instrument 170 (e.g., LS instrument) and at least one additional analytical instrument 270 (e.g., UV detector, DRI instrument, DP instrument). Namely, FIG. 8 depicts that band-broadener 234 could output UV data, DRI data, and DP data that are band-broadened with respect to LS data.

FIG. 8 depicts the results of band-broadener 234 band-broadening particular UV data, DRI data, and DP data with respect to particular LS data. FIG. 8 depicts the results of the computer implemented method, system, and computer program product band-broadening particular UV data, DRI data, and DP data with respect to particular LS data.

In an embodiment, band-broadener 234 applies a band-broadening procedure, such as the band-broadening technique disclosed by U.S. Pat. Nos. 7,386,427 and/or 7,911,594, to aligned sample data 262 to correct for the effects of inter-detector band-broadening. In an embodiment, band-broadener 234 artificially broadens data from instruments earlier in the instrument chain with a gaussian convolved exponential kernel (i.e., a nonlinear fitting procedure) such that time slices of data from all instruments in the detector chain are synchronized, where the alignment results (i.e., aligned sample data 262) are used as a seed for one parameter in this nonlinear fitting procedure, resulting in the signals from all detectors in the analytical chain overlapping temporally (i.e., band-broadened sample data 264), as depicted in FIG. 8. Band-broadened sample data 264 could allow for one slice of data from one detector in the detector chain (e.g., LS data) to be directly compared to a slice of data from the same time point from another detector in the detector chain (e.g., UV data, DRI data, DP data).

Normalizing Known Sample Data

For example, method processer 134 could generate normalized known sample data, as described in Table 1 for analytical instruments, such as a UV detector, a LS instrument, a DRI instrument, and DP instrument. In a specific example, Table 1 describes the results of method processer 134 normalizing known sample data 162 (e.g., UV data, LS data, DRI data, DP data) with respect to baseline 250 and a known sample maximum peak value among known sample data 162. Namely, Table 1 demonstrates that method processer 134 could normalize known sample data with respect to LS data.

TABLE 1

|  | Old | New |
|---|---|---|
| Detector 1 | 1.000 | 1.000 |
| Detector 2 | 3.042 | 3.007 |
| Detector 3 | 2.024 | 2.025 |
| Detector 4 | 2.503 | 2.497 |
| Detector 5 | 2.628 | 2.623 |
| Detector 6 | 0.828 | 0.825 |
| Detector 7 | 0.850 | 0.849 |
| Detector 8 | 0.941 | 0.940 |
| Detector 9 | 0.970 | 0.969 |
| Detector 10 | 1.021 | 1.021 |
| Detector 11 | 1.000 | 1.000 |
| Detector 12 | 1.069 | 1.070 |
| Detector 13 | 0.927 | 0.927 |
| Detector 14 | 0.985 | 0.984 |
| Detector 15 | 0.845 | 0.844 |
| Detector 16 | 1.000 | 1.000 |
| Detector 17 | 2.560 | 2.554 |
| Detector 18 | 2.085 | 2.044 |

Table 1 lists the results of method processer 134 normalizing particular LS data. Table 1 lists the results of the computer implemented method, system, and computer program product normalizing particular LS data.

In an embodiment, at least one analytical instrument 170 is a MALS detector. In an embodiment, method processer 134 normalizes known sample data 162 by analyzing data from an isotropic scatterer that scatters light with the same intensity at every angle, collecting data from all angles with the MALS detector, calculating a normalization factor for each detector of the MALS detector based on the 90° angle detector of the MALS detector (e.g., detector 11 in Table 1), and applying the normalization factors to the respective detectors of the MALS detector.

Running Validated Analytical Method

Figure 9:
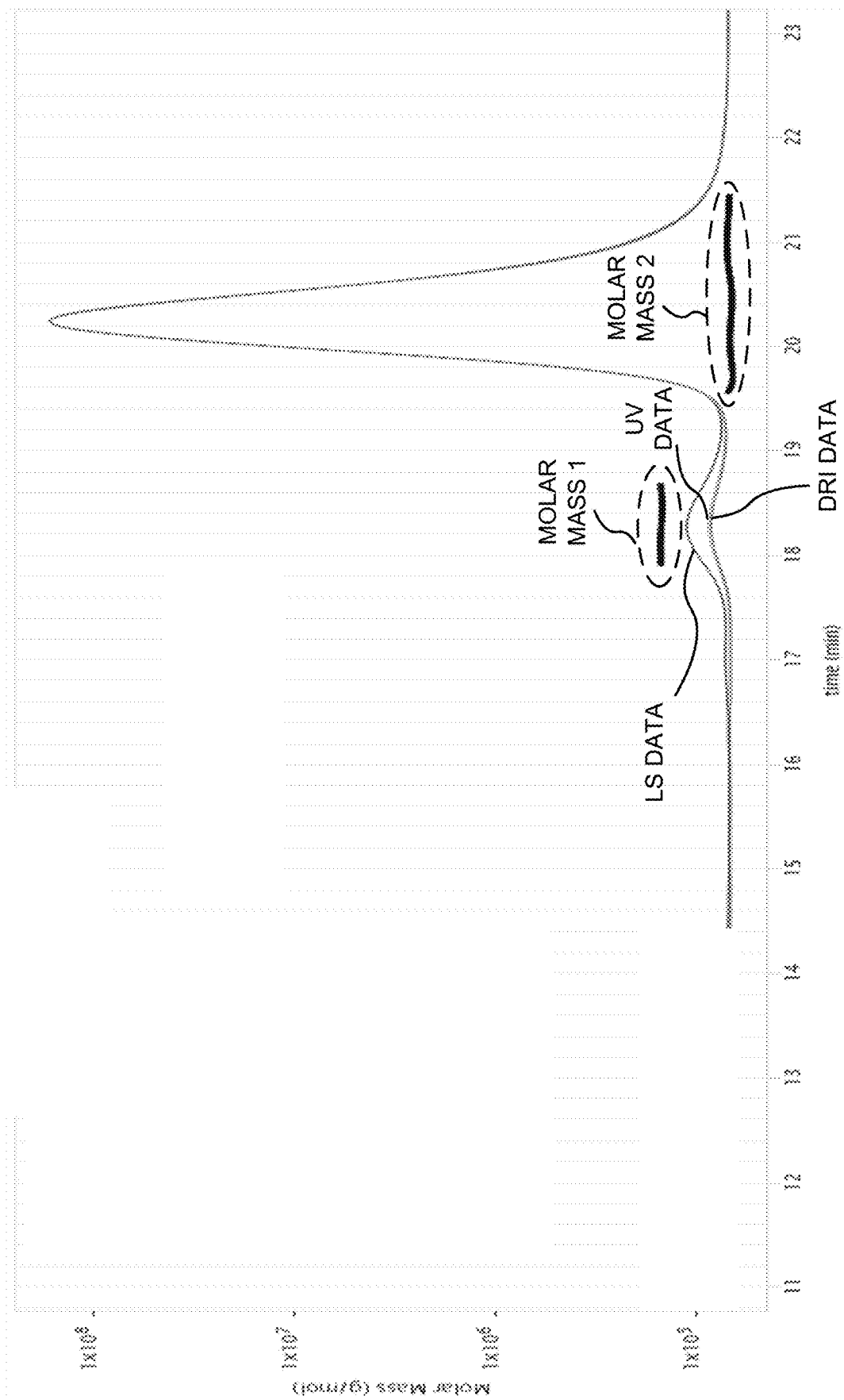
FIG. 9 depicts a graph in accordance with an embodiment

For example, validated method runner 136 could generate analyzed sample data 166 as depicted in FIG. 9 for analytical instruments, such as a UV detector, a LS instrument, a DRI instrument, and a DP instrument. In a specific example, FIG. 9 depicts the results of validated method runner 136 running at least one validated analytical method 164 on at least one unknown sample 156 on at least one analytical instrument 170 (e.g., UV detector, LS instrument, DRI instrument, DP instrument) with respect to set-up information 150. Namely, FIG. 9 depicts that validated method runner 136 could output UV data, LS data, DRI data, and DP data for an unknown sample that are aligned and band-broadened and could output molar mass data (e.g., molar mass 1, molar mass 2) of at least one unknown sample 156.

FIG. 9 depicts the results of validated method runner 136 running a validated analytical method on an unknown sample (i.e., at least one unknown sample 156) on a UV detector, an LS instrument, a DRI instrument, and a DP instrument. FIG. 9 depicts the results of the computer implemented method, system, and computer program product running a validated analytical method on an unknown sample (i.e., at least one unknown sample 156) on a UV detector, an LS instrument, a DRI instrument, and a DP instrument.

For example, validated method runner 136 could run validated analytical method 164 on unknown sample 156 consisting of two species (monomer and dimer) with two different molecular weights/molar masses, with each of the species being monodisperse such that the molar mass of a particular species would not vary across the peak of the species, as depicted in FIG. 9. Namely, the molar mass traces (molar mass 1, molar mass 2) in FIG. 9 are flat traces across the monomer peak (at approximately 20 minutes) and the dimer peak (at approximately 18 minutes).

Computer System

In an exemplary embodiment, the computer system is a computer system 1000 as shown in FIG. 10. Computer system 1000 is only one example of a computer system and is not intended to suggest any limitation as to the scope of use or functionality of embodiments of the present invention. Regardless, computer system 1000 is capable of being implemented to perform and/or performing any of the functionality/operations of the present invention.

Computer system 1000 includes a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 1012 may be described in the general context of computer system-executable instructions, such as program modules, being executed by a computer system. Generally, program modules may include routines, programs, objects, components, logic, and/or data structures that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computer system 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions/operations of embodiments of the invention.

Program/utility 1040, having a set (at least one) of program modules 1042, may be stored in memory 1028 by way of example, and not limitation. Exemplary program modules 1042 may include an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the present invention.

Computer system/server 1012 may also communicate with one or more external devices 1014 such as a keyboard, a pointing device, a display 1024, one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, by a computer system, set-up information, wherein the set-up information describes at least one analytical instrument, at least one analysis to be performed on data collected by the at least one analytical instrument, and at least one analytical method;
executing, by the computer system, in response to receiving at least one instruction to automate the at least one analysis, a set of logical operations running the at least one analytical method on at least one known sample on the at least one analytical instrument with respect to the set-up information, resulting in known sample data;
executing, by the computer system, a set of logical operations defining a known sample peak region among the known sample data with respect to at least one member of a first set consisting of a baseline among the known sample data and a time period of the known sample data,
wherein the defining comprises
executing, by the computer system, a set of logical operations identifying a known sample maximum peak value among the known sample data with respect to the baseline by stepping through the known sample data and determining when a curve representing the known sample data transitions from increasing to decreasing, and
executing, by the computer system, a set of logical operations defining the known sample peak region with respect to the known sample maximum peak value;
executing, by the computer system, a set of logical operations aligning, with respect to the known sample peak region, additional detector data collected by at least one additional analytical instrument coupled to the at least one analytical instrument, resulting in aligned sample data;
executing, by the computer system, a set of logical operations band-broadening the aligned sample data with respect to the at least one analytical instrument and the at least one additional analytical instrument, resulting in band-broadened sample data; and
executing, by the computer system, a set of logical operations running the at least one analytical method on at least one unknown sample on the at least one analytical instrument with respect to the set-up information and the band-broadened sample data, resulting in analyzed sample data.

2. The method of claim 1 wherein the set-up information comprises:
instrument information describing the at least one analytical instrument;
configuration information describing at least one configuration of the at least one analytical instrument;
method information describing the at least one analytical method; and
operation information describing at least one operation to be performed during the at least one analysis.

3. The method of claim 2 wherein the set-up information further comprises:
at least one member of a second set consisting of
application information describing at least one analytical application corresponding to the at least one analysis,
known sample information corresponding to the at least one known sample,
unknown sample information corresponding to the at least one unknown sample, and
flow information corresponding to at least one member of a third set consisting of the at least one analytical instrument, the at least one analysis, the at least one analytical method, and the at least one unknown sample.

4. The method of claim 1 wherein the at least one analytical instrument is one of a particle fractionation system, a light scattering instrument, a viscometer, a refractometer, an ultraviolet-visible absorption detector, an infrared absorption detector, an evaporative light scattering detector, a Raman spectroscopy detector, an inductively coupled plasma mass spectrometry, a fluorescence detector, a conductivity detector, and a pH detector.

5. The method of claim 4
wherein the particle fractionation system is one of a liquid chromatography system and a field flow fractionation (FFF) system,
wherein the liquid chromatography system comprises at least one member of a second set consisting of a high performance liquid chromatography system, an ultra-high-performance liquid chromatography system, a reverse-phase chromatography system, an affinity chromatography system, and a fast protein liquid chromatography system, and
wherein the FFF system comprises at least one member of a third set consisting of an asymmetric flow FFF system, a gravitational FFF system, a centrifugal FFF system, a thermal-gradient FFF system, an electrical FFF system, a magnetic FFF system, a flow FFF system, a hollow fiber FFF system, and a split flow thin-cell fractionation system.

6. The method of claim 5 wherein the liquid chromatography system comprises:
at least one pump;
at least one chromatography column; and
at least one sample injector.

7. The method of claim 4
wherein the light scattering instrument is one of a static light scattering instrument and a dynamic light scattering instrument.

8. The method of claim 1 wherein the band-broadening comprises:
executing, by the computer system, a set of logical operations fitting the additional detector data to a band-broadening software kernel, thereby broadening the additional detector data to match a width of the data collected by the at least one analytical instrument.

9. The method of claim 1 further comprising:
executing, by the computer system, a set of logical operations normalizing the known sample data with respect to the baseline and a known sample maximum peak value among the known sample data.

10. The method of claim 9 wherein the normalizing comprises:
dividing a signal from each photodiode detector of the at least one analytical instrument by a signal from a calibration photodiode of the at least one analytical instrument.

11. The method of claim 1 further comprising:
storing alignment data corresponding to the at least one validated analytical method in a data store;
storing band-broadening data corresponding to the at least one analytical method in the data store; and
storing method information corresponding to the at least one analytical method in the data store.

12. The method of claim 11 wherein the storing further comprises:
storing normalization data corresponding to the at least one analytical method in the data store.

13. The method of claim 1 further comprising:
executing, by the computer system, a set of logical operations identifying at least one change in at least one operating condition of at least one member of a second set consisting of the at least one analytical instrument, the at least one analysis, and the at least one analytical method; and
executing, by the computer system, in response to the identifying, a set of logical operations changing a status of the at least one analytical method to indicate that the at least one analytical method is invalid.

14. A system comprising:
a memory; and
a processor in communication with the memory, the processor configured to perform a method comprising
receiving set-up information, wherein the set-up information describes at least one analytical instrument, at least one analysis to be performed on data collected by the at least one analytical instrument, and at least one analytical method,
executing, in response to receiving at least one instruction to automate the at least one analysis, a set of logical operations running the at least one analytical method on at least one known sample on the at least one analytical instrument with respect to the set-up information, resulting in known sample data,
executing a set of logical operations defining a known sample peak region among the known sample data with respect to at least one member of a set consisting of a baseline among the known sample data and a time period of the known sample data,
wherein the defining comprises
executing, by the computer system, a set of logical operations identifying a known sample maximum peak value among the known sample data with respect to the baseline by stepping through the known sample data and determining when a curve representing the known sample data transitions from increasing to decreasing, and
executing, by the computer system, a set of logical operations defining the known sample peak region with respect to the known sample maximum peak value,
executing a set of logical operations aligning, with respect to the known sample peak region, additional detector data collected by at least one additional analytical instrument coupled to the at least one analytical instrument, resulting in aligned sample data,
executing a set of logical operations band-broadening the aligned sample data with respect to the at least one analytical instrument and the at least one additional analytical instrument, resulting in band-broadened sample data, and
executing a set of logical operations running the at least one analytical method on at least one unknown sample on the at least one analytical instrument with respect to the set-up information and the band-broadened sample data, resulting in analyzed sample data.

15. A computer program product comprising a computer readable storage medium having program instructions embodied therewith, the program instructions executable by a processor to cause the processor to perform a method comprising:
receiving set-up information, wherein the set-up information describes at least one analytical instrument, at least one analysis to be performed on data collected by the at least one analytical instrument, and at least one analytical method;
executing, in response to receiving at least one instruction to automate the at least one analysis, a set of logical operations running the at least one analytical method on at least one known sample on the at least one analytical instrument with respect to the set-up information, resulting in known sample data;
executing a set of logical operations defining a known sample peak region among the known sample data with respect to at least one member of a set consisting of a baseline among the known sample data and a time period of the known sample data,
wherein the defining comprises
executing, by the computer system, a set of logical operations identifying a known sample maximum peak value among the known sample data with respect to the baseline by stepping through the known sample data and determining when a curve representing the known sample data transitions from increasing to decreasing, and
executing, by the computer system, a set of logical operations defining the known sample peak region with respect to the known sample maximum peak value;
executing a set of logical operations aligning, with respect to the known sample peak region, additional detector data collected by at least one additional analytical instrument coupled to the at least one analytical instrument, resulting in aligned sample data;
executing a set of logical operations band-broadening the aligned sample data with respect to the at least one analytical instrument and the at least one additional analytical instrument, resulting in band-broadened sample data; and
executing a set of logical operations running the at least one validated analytical method on at least one unknown sample on the at least one analytical instrument with respect to the set-up information and the band-broadened sample data, resulting in analyzed sample data.

* * * * *